United States Patent
Niu

(10) Patent No.: US 8,183,423 B2
(45) Date of Patent: May 22, 2012

(54) PYROLYSIS PROCESS FOR WASTE AND OLD RUBBER

(76) Inventor: Bin Niu, Jinan (CN)

( * ) Notice: Subject to any disclaimer, the term of this patent is extended or adjusted under 35 U.S.C. 154(b) by 321 days.

(21) Appl. No.: 12/448,474

(22) PCT Filed: Dec. 20, 2006

(86) PCT No.: PCT/CN2006/003500
§ 371 (c)(1),
(2), (4) Date: Jun. 22, 2009

(87) PCT Pub. No.: WO2008/074188
PCT Pub. Date: Jun. 26, 2008

(65) Prior Publication Data
US 2010/0084602 A1    Apr. 8, 2010

(51) Int. Cl.
*C01B 31/00*    (2006.01)
(52) U.S. Cl. .......... 585/241; 44/605; 208/106; 208/113; 208/126; 208/127
(58) Field of Classification Search .................... 44/605; 585/241; 208/106, 113, 126–127
See application file for complete search history.

(56) References Cited

U.S. PATENT DOCUMENTS 5,744,668 A * 4/1998 Zhou et al. .................. 585/241
2006/0004236 A1 1/2006 Barvincak

FOREIGN PATENT DOCUMENTS

| CN | 1117517 | 2/1996 |
|---|---|---|
| CN | 1123822 | 6/1996 |
| CN | 1052500 | 6/1999 |
| CN | 1374369 | 10/2002 |
| JP | 9-310075 | 12/1997 |

OTHER PUBLICATIONS

International Search Report for PCT/CN2006/003500 mailed Oct. 11, 2007, 6 pages.

* cited by examiner

*Primary Examiner* — Walter D Griffin
*Assistant Examiner* — Brian McCaig
(74) *Attorney, Agent, or Firm* — Nixon & Vanderhye PC

(57) ABSTRACT

This invention is about a cracking technology of waste rubber, and the content of this technology is as following: the rubber mass with the catalyst were added in the cracking chamber and the cracking process of the raw material is finished. The main contents and weight percentage of catalyzer are as following: the aluminosilicate is from 35 to 50, the active alumina is from 15 to 30, the zinc oxide is from 10 to 20, the active argil is from 5 to 15, the kaoline is from 5 to 15, the weight ratio of catalyst and rubber is 2-7:1000; The cracking temperature is from 350 to 450° C. The rubber mass crack comparative downright in low temperature by using this combinatorial catalyst, that's because the temperature is controlled between 350 and 450° C., which commendably control the cracking process of the carbon chain of rubber. Moreover, more low carbon chain products can be gained for the symmetrical cracking. Therefore, the emerging ratio of the oil will become higher, the exhaust gas emission will become lower and the eligible emission will really come ture.

12 Claims, 1 Drawing Sheet

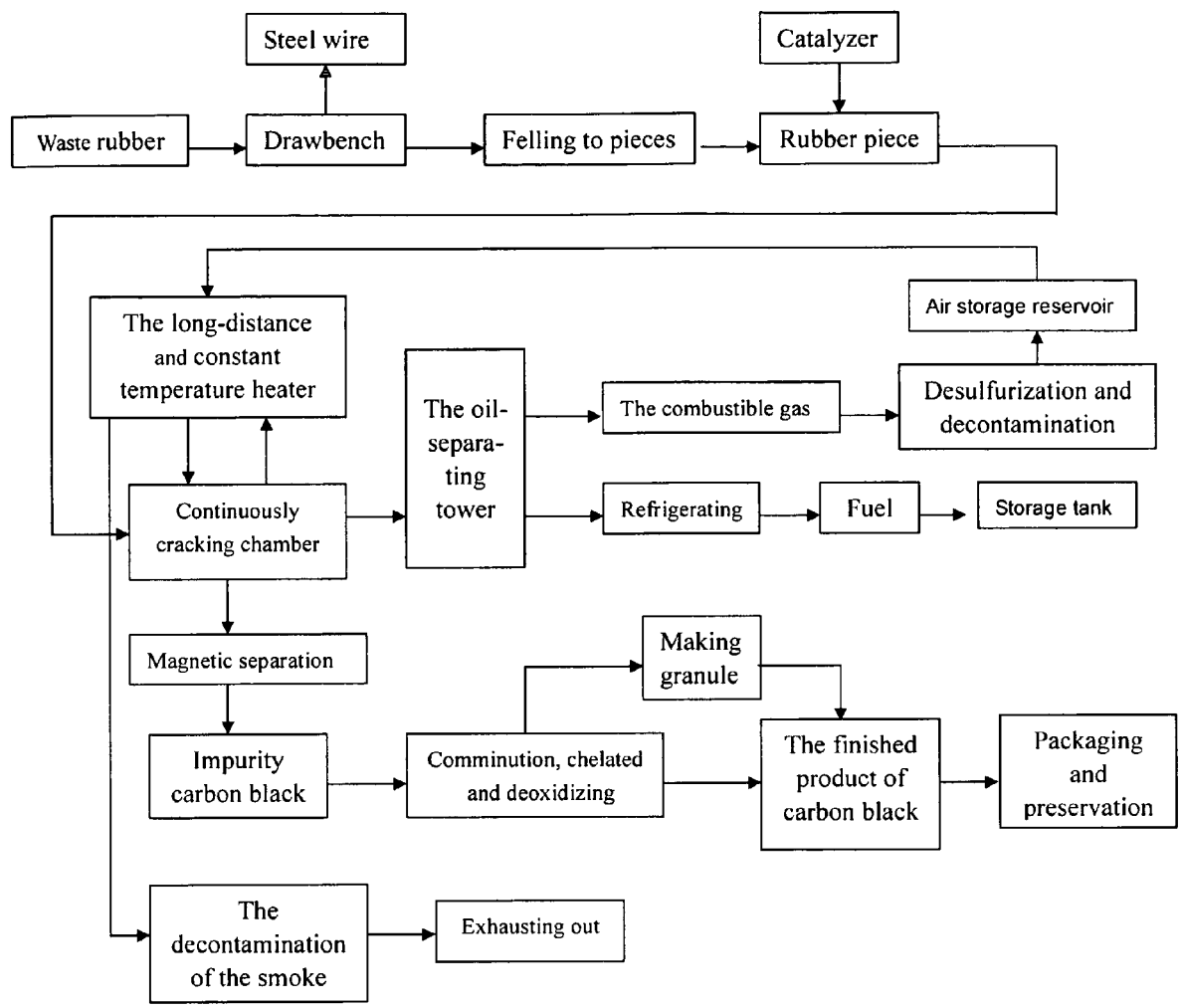

though the waste rubber could be cracked completely
PYROLYSIS PROCESS FOR WASTE AND OLD RUBBER This application is the U.S. national phase of International Application No. PCT/CN2006/003500 filed 20 Dec. 2006 which designated the U.S., the entire contents of each of which is hereby incorporated by reference.

FIELD OF INVENTION

This invention is about a new cracking technology of waste rubber, which is the key to produce oil by use of waste rubber.

BACKGROUND OF THE INVENTION

As is known, waste rubber can be re-produced into gasoline, diesel oil and others after being cracked, that not only gives out a good means for disposal of the industrial rubbish, like rubber, etc. from waste tyres and so on in modern society, but also provides a new plan for the improvement of decreasing resources and energy. However, at present time, almost all of present technologies usually use the high temperature cracking technology, which break down the carbon chain of the rubber in the high temperature, and get the low carbon chain of oil and gas for recycling use. However, the cracking temperature commonly need up to 500□ in all of present technologies, what's more, some usually need up from 700 to 800□. Though the waste rubber could be cracked completely at this temperature, the carbon chain was also broken down excessively and gained the lower carbon chain of gaseous products because of the high temperature. Accordingly, a huge gas processor should be needed to treat with the follow-up product and some oil product could not be used directly for the bad quality. The gas product has higher content of sulfur, which will pollute the environment when using. In order to gain the high cracking temperature, the cracking chamber needs enough quantity of heat, which costs much more fuel. However, the efficiency is much lower and it makes against to the industrial production. Because of the cracking temperature is about 700° C., the quality of the carbon black, which was produced after the cracking process, will become bad and it's hard to revert. Moreover, the recycle of it will become hard.

Thus it can be seen that a good many problems and shortages exist in present technologies of cracking waste rubber, such as overmuch depending on the energy, the income is lower and polluting the human living environment because of the technical problem.

SUMMARY OF THE INVENTION

To the shortages existing in present technologies, this invention provides a cracking technology of waste rubber, and the main content of it is as following: the breaking up technology of waste rubber, the continuously cracking technology, the separating and fractionation technology of the oil-gas after cracking, the purification and decontamination technology of the carbon black, the comprehensive utilization technology of the combustible gas and the purifying treatment technology of tail gas. Adopting the technology providing by this invention, the cracking temperature will become lower, the cost of energy consumption can be reduced, the quality of cracking product can be increased and the pollution of environment will become lower.

The specific content of this technology is adding the rubber mass with the catalyst to the cracking chamber, and next the cracking process of the raw material is finished. The main contents and weight percentage of catalyzer are as following: the aluminosilicate is from 35 to 50 wt %, the active alumina is from 15 to 30 wt %, the zinc oxide is from 10 to 20 wt %, the active argil is from 5 to 15 wt % and the kaoline is from 5 to 15 wt %. The weight ratio of catalyst and rubber is 2-7: 1000. The cracking temperature is from 350 to 450° C. The rubber mass crack completely in low temperature by using this combinatorial catalyst, that's because the temperature is controlled between 350 and 450° C., and that method commendably controlled the cracking process of the carbon chain of rubber. Moreover, more low carbon chain products can be gained by the symmetrical cracking. Therefore, the emersion ratio of the oil will become higher, the exhaust gas emission will become lower and the eligible emission will really come ture.

The aluminosilicate molecular sieve was used in this technology, and the main use of it is the model Y, 3A, 4A, and 5A.

When cracking, the heating temperature difference, which is the temperature difference in different part of cracking chamber without adding the raw material, should be controlled at or within 10° C. Ordinarily, that temperature difference is between the inlet orifice and discharge hole less than 10° C. Moreover, at that temperature, it not only reaches the needing temperature for the cracking of rubber, but also ensures the cracking process steadily continuously progressing because of the temperature difference is less than or equal to 10° C. What's more, the quality of the cracking rubber can be ensured and the oil-gas ratio will be optimal.

The cracking time can be set according to the requirement when cracking. Usually, it can be set at 10 and 70 minutes or shorter or longer. However, considering the production efficiency and cracking effect, the cracking time can be controlled between 20 and 60 minutes. All of that helps ensure the cracking time becomes shorter, compared to the high temperature cracking. On this basis, the cost of energy consumption will be reduced, much more time will be saved when treating large volumes of waste rubber, and the quality of cracking products will be ensured at the same time the treatment efficiency will be improved.

In the invention, the cracking temperature can be controlled further from 370 to 420° C. At this temperature, the cracking effect of raw material and the quality of the oil are better. Moreover, the quality of exhaust gas can be improved. On this basis, if controlling the cracking temperature from 380 to 390° C., the effect is better. What's more, at this temperature, the rubber can crack completely, the liquid-gas ratio getting by cracking is best, the quality of oil product is optimal, the separation of the gasoline and diesel oil is thorough at the same time the content of impurity is lowest, the volume of the emanating combustible gas is fewer, and it can predigest the follow-up process or reduce the technical requirement for the follow-up process.

The heating mode can use the present methods in the cracking process. However, the best is using temperature controlled gaseity, liquid state or solid state carrier, such as the heating liquid molten salt. In order to achieve the heating request, the heating temperature of heat carrier can be controlled between 380 and 490° C., which ensures the cracking temperature in the cracking chamber satisfies the request. Using of this heating method can provide a steady temperature circumstance in cracking chamber and ensure the cracking process progressing steadily. What's more, controlling the temperature at this scope, the inner temperature of cracking chamber can reach the requested temperature for the rubber cracking.

When the cracking process is finished, the cracking gas can get combustible gas and oil by fractionating. According to the different request, the combustible gas can be directly expelled out or stored after desulfurized.

The combustible gas can be directly expelled into the heating furnace, which supplying the heat to the cracking process. And it also can be stored for other use. All of these methods can make the best use of combustible gas. The combustible gas will make exhaust gas again after burning in the heating furnace, and this exhaust gas can be expelled out directly. However, if it falls short of the stated request, a secondary treating will be needed. The secondary treating can adopt the following mode: refrigerating the exhaust gas below 70° C., then dealing with it by the transaction layer of active carbon, active fiber and zeolite molecular sieve respectively. At this temperature the contamination in the exhaust gas will be adsorbed and ensure it reach the emission standard. What's more, the refrigerating temperature can be further controlled between 40 and 55° C., because it will be better for adsorbing the contamination in exhaust gas, and the equipment cost will be lower. In this invention, the secondary treating technology will be accomplished by the present exhaust gas processing equipment.

When the exhaust gas passes the different transaction layer in secondary treating, the through speed of the exhaust gas should be controlled between 0.1 and 1 m/s, which ensure the contamination being adsorbed adequately. By reducing the through speed of the exhaust gas, the contamination adsorbed in the transaction layer is better. Therefore, the exhaust gas emission can reach the emission standard. Moreover, the refrigerating technology can use the present gas cooling technology and equipment.

The solid state product, which is produced after cracking process, contains carbon black. And it can be made into carbon black by the procedure of magnetic separation, comminution and selection by winnowing. According to different demand, a series of different thickness carbon black can be gained by the above-mentioned treating method, such as more than 650 mesh. After accomplishing the aforementioned process, the stearic acid is added into the carbon black. And it can be mixed with the remaining components, into zinc stearate. What's more, the zinc stearate can reinforce the role of carbon black. That's because the zinc stearate can form the zinc stearate, which is a reinforcing agent, by reacting with zinc oxide.

BRIEF DESCRIPTION OF THE DRAWINGS

FIG. 1 is the process flow diagram of the example 84 of this invention.

DETAILED DESCRIPTION OF THE PREFERRED EMBODIMENT

The following examples are only the further explanation of the technical content of this invention, but not the confinement for this invention.

EXAMPLE 1

The components and weight percentage of the catalyzer are as following: the model of molecular sieve is 3A, which is the aluminosilicate. The aluminosilicate is 35 wt %, the active alumina is 15 wt %, the zinc oxide is 10 wt %, the active argil is 5 wt % and the kaoline is 5 wt %. The weight ratio of catalyst and rubber is 2:1000, and then the mixture is transported into the reactor for the cracking reaction. The cracking temperature is 450° C., the cracking time is 10 minutes and the heating temperature difference in the cracking chamber is 10° C. The liquid state product can be made into needing oil by fractionating. Moreover, the gas state and solid state products can be given up directly or treated further by the conventional method. The rest parts exercise the same as the existing technologies.

EXAMPLE 2

The components and weight percentage of the catalyzer are as following: the model of molecular sieve is 4A, and the weight percentage is 40. The active alumina is 18 wt %, the zinc oxide is 12 wt %, the active argil is 7 wt % and the kaoline is 11 wt %. The weight ratio of catalyst and rubber is 3:1000, and then the mixture is transported into the reactor for the cracking reaction. The cracking temperature is 360° C., the cracking time is 80 minutes and the heating temperature difference in the cracking chamber is 9° C. The liquid state product can be made into needing oil by fractionating. Moreover, the gas state and solid state products can be given up directly or treated further by the conventional method. The rest parts exercise the same as the existing technologies.

EXAMPLE 3

The components and weight percentage of the catalyzer are as following: the model of molecular sieve is Y, and the weight percentage is 45. The active alumina is 20 wt %, the zinc oxide is 15 wt %, the active argil is 10 wt % and the kaoline is 8 wt %. The weight ratio of catalyst and rubber is 5:1000, and then the mixture is transported into the reactor for the cracking reaction. The cracking temperature is 350° C., the cracking time is 50 minutes and the heating temperature difference in the cracking chamber is 9° C. The liquid state product can be made into needing oil by fractionating. Moreover, the gas state and solid state products can be given up directly or treated further by the conventional method. The rest parts exercise the same as the existing technologies.

EXAMPLE 4

The components and weight percentage of the catalyzer are as following: the model of molecular sieve is 5A, and the weight percentage is 36. The active alumina is 16 wt %, the zinc oxide is 11 wt %, the active argil is 6 wt % and the kaoline is 6 wt %. The weight ratio of catalyst and rubber is 4:1000, and then the mixture is transported into the reactor for the cracking reaction. The cracking temperature is 370° C., the cracking time is 60 minutes and the heating temperature difference in the cracking chamber is 8° C. The liquid state product can be made into needing oil by fractionating. Moreover, the gas state and solid state products can be given up directly or treated further by the conventional method. The rest parts exercise the same as the existing technologies.

EXAMPLE 5

The components and weight percentage of the catalyzer are as following: the model of molecular sieve is 3A, and the weight percentage is 37. The active alumina is 17 wt %, the zinc oxide is 12 wt %, the active argil is 7 wt % and the kaoline is 8 wt %. The weight ratio of catalyst and rubber is 4.5:1000, and then the mixture is transported into the reactor for the cracking reaction. The cracking temperature is 420° C., the cracking time is 20 minutes and the heating temperature difference in the cracking chamber is 6° C. The liquid state product can be made into needing oil by fractionating. Moreover, the gas state and solid state products can be given up directly or treated further by the conventional method. The rest parts exercise the same as the existing technologies.

EXAMPLE 6

The components and weight percentage of the catalyzer are as following: the model of molecular sieve is 4A, and the weight percentage is 38. The active alumina is 18 wt %, the zinc oxide is 13 wt %, the active argil is 8 wt % and the kaoline is 7 wt %. The weight ratio of catalyst and rubber is 5:1000, and then the mixture is transported into the reactor for the cracking reaction. The cracking temperature is 380° C., the cracking time is 40 minutes and the heating temperature difference in the cracking chamber is 7° C. The liquid state product can be made into needing oil by fractionating. Moreover, the gas state and solid state products can be given up directly or treated further by the conventional method. The rest parts exercise the same as the existing technologies.

EXAMPLE 7

The components and weight percentage of the catalyzer are as following: the model of molecular sieve is 3A, and the weight percentage is 39. The active alumina is 19 wt %, the zinc oxide is 14 wt %, the active argil is 10 wt % and the kaoline is 9 wt %. The weight ratio of catalyst and rubber is 5:1000, and then the mixture is transported into the reactor for the cracking reaction. The cracking temperature is 390° C., the cracking time is 30 minutes and the heating temperature difference in the cracking chamber is 10° C. The liquid state product can be made into needing oil by fractionating. Moreover, the gas state and solid state products can be given up, directly or treated further by the conventional method. The rest parts exercise the same as the existing technologies.

EXAMPLE 8

The components and weight percentage of the catalyzer are as following: the model of molecular sieve is Y, and the weight percentage is 40. The active alumina is 20 wt %, the zinc oxide is 15 wt %, the active argil is 9 wt % and the kaoline is 10 wt %. The weight ratio of catalyst and rubber is 2:1000, and then the mixture is transported into the reactor for the cracking reaction. The cracking temperature is 410° C., the cracking time is 15 minutes and the heating temperature difference in the cracking chamber is 1° C. The liquid state product can be made into needing oil by fractionating. Moreover, the gas state and solid state products can be given up directly or treated further by the conventional method. What's more, the temperature of the heat carrier can be adjusted at 435° C., which satisfy the temperature request for cracking. The rest parts exercise the same as the existing technologies.

EXAMPLE 9

The components and weight percentage of the catalyzer are as following: the model of molecular sieve is 5A, and the weight percentage is 40. The active alumina is 18 wt %, the zinc oxide is 12 wt %, the active argil is 7 wt % and the kaoline is 11 wt %. The weight ratio of catalyst and rubber is 3:1000, and then the mixture is transported into the reactor for the cracking reaction. The cracking temperature is 360° C., the cracking time is 80 minutes and the heating temperature difference in the cracking chamber is 2° C. The liquid state product can be made into needing oil by fractionating. Moreover, the gas state and solid state products can be given up directly or treated further by the conventional method. What's more, the temperature of the heat carrier can be adjusted at 380° C., which satisfy the temperature request for cracking. The rest parts exercise the same as the existing technologies.

EXAMPLE 10

The components and weight percentage of the catalyzer are as following: the model of molecular sieve is 3A, and the weight percentage is 45. The active alumina is 20 wt %, the zinc oxide is 15 wt %, the active argil is 10 wt % and the kaoline is 8 wt %. The steel wires were separated from rubber by drawing the waste rubber into thread, and then the big pieces of rubber were broken up into granule. The weight ratio of catalyst and rubber is 5:1000, and then the mixture is transported into the reactor for the cracking reaction. The cracking temperature is 350° C. and the cracking time is 50 minutes. The liquid state product can be made into needing oil by fractionating. Moreover, the gas state and solid state products can be given up directly or treated further by the conventional method. What's more, the temperature of the heat carrier can be adjusted at 385° C., which satisfy the temperature request for cracking. The rest parts exercise the same as the existing technologies.

EXAMPLE 11

The components and weight percentage of the catalyzer are as following: the model of molecular sieve is 3A, and the weight percentage is 41. The active alumina is 21 wt %, the zinc oxide is 16 wt %, the active argil is 12 wt % and the kaoline is 12 wt %. The weight ratio of catalyst and rubber is 3.5:1000, and then the mixture is transported into the reactor for the cracking reaction. The cracking temperature is 370° C. and the cracking time is 55 minutes. The liquid state product can be made into needing oil by fractionating. Moreover, the gas state and solid state products can be given up directly or treated further by the conventional method. What's more, the temperature of the heat carrier can be adjusted at 405° C., which satisfy the temperature request for cracking. The rest parts exercise the same as the existing technologies.

EXAMPLE 12

The components and weight percentage of the catalyzer are as following: the model of molecular sieve is 4A, and the weight percentage is 42. The active alumina is 22 wt %, the zinc oxide is 17 wt %, the active argil is 11 wt % and the kaoline is 11 wt %. The weight ratio of catalyst and rubber is 6.5:1000, and then the mixture is transported into the reactor for the cracking reaction. The cracking temperature is 420° C. and the cracking time is 20 minutes. The liquid state product can be made into needing oil by fractionating. Moreover, the gas state and solid state products can be given up directly or treated further by the conventional method. What's more, the temperature of the heat carrier can be adjusted at 445° C., which satisfy the temperature request for cracking. The rest parts exercise the same as the existing technologies.

EXAMPLE 13

The components and weight percentage of the catalyzer are as following: the model of molecular sieve is Y, and the weight percentage is 44. The active alumina is 24 wt %, the zinc oxide is 19 wt %, the active argil is 13 wt % and the kaoline is 12 wt %. The weight ratio of catalyst and rubber is 5.5:1000, and then the mixture is transported into the reactor for the cracking reaction. The cracking temperature is 380° C. and the cracking time is 45 minutes. The liquid state product can be made into needing oil by fractionating. Moreover, the gas state and solid state products can be given up directly or treated further by the conventional method. What's more, the temperature of the heat carrier can be adjusted at 425° C., which satisfy the temperature request for cracking. The rest parts exercise the same as the existing technologies.

EXAMPLE 14

The components and weight percentage of the catalyzer are as following: the model of molecular sieve is 3A, and the weight percentage is 45. The active alumina is 25 wt %, the zinc oxide is 20 wt %, the active argil is 14 wt % and the kaoline is 13 wt %. The steel wires were separated from rubber by drawing the waste rubber into thread, and then the big pieces of rubber were broken up into granule. The weight ratio of catalyst and rubber is 2.5:1000, and then the mixture is transported into the reactor for the cracking reaction. The cracking temperature is 390° C. and the cracking time is 30 minutes. The liquid state product can be made into needing oil by fractionating. Moreover, the gas state and solid state products can be given up directly or treated further by the conventional method. What's more, the temperature of the heat carrier can be adjusted at 425° C., which satisfy the temperature request for cracking. The rest parts exercise the same as the existing technologies.

EXAMPLE 15

The components and weight percentage of the catalyzer are as following: the model of molecular sieve is 5A, and the weight percentage is 35. The active alumina is 15 wt %, the zinc oxide is 10 wt %, the active argil is 5 wt % and the kaoline is 5 wt %. The weight ratio of catalyst and rubber is 2:1000, and then the mixture is transported into the reactor for the cracking reaction. The cracking temperature is 450° C. and the cracking time is 10 minutes. The liquid state product can be made into needing oil by fractionating. Moreover, the gas state and solid state products can be given up directly or treated further by the conventional method. In this example, the heat carrier was heated at the furnace and transported into the reactor. Then the heat carrier supplied a quantity of heat for the cracking process. The cracking gas can get combustible gas and oil by fractionating. What's more, the combustible gas, which was desulfurized by the conventional desulfurization method, can be directly expelled into or stored and then expelled into the heating furnace for burning. The rest parts exercise the same as the existing technologies.

EXAMPLE 16

The components and weight percentage of the catalyzer are as following: the model of molecular sieve is 5A, and the weight percentage is 40. The active alumina is 18 wt %, the zinc oxide is 12 wt %, the active argil is 7 wt % and the kaoline is 11 wt %. The weight ratio of catalyst and rubber is 3:1000, and then the mixture is transported into the reactor for the cracking reaction. The cracking temperature is 360° C. and the cracking time is 75 minutes. The liquid state product can be made into needing oil by fractionating. Moreover, the gas state and solid state products can be given up directly or treated further by the conventional method. In this example, the heat carrier was heated at the furnace and transported into the reactor. Then the heat carrier supplied a quantity of heat for the cracking process. The cracking gas can get combustible gas and oil by fractionating. What's more, the combustible gas, which was desulfurized by the conventional desulfurization method, can be directly expelled into or stored and then expelled into the heating furnace for burning. The rest parts exercise the same as the existing technologies.

EXAMPLE 17

The components and weight percentage of the catalyzer are as following: the model of molecular sieve is 3A, and the weight percentage is 45. The active alumina is 20 wt %, the zinc oxide is 15 wt %, the active argil is 10 wt % and the kaoline is 8 wt %. The weight ratio of catalyst and rubber is 5:1000, and then the mixture is transported into the reactor for the cracking reaction. The cracking temperature is 350° C. and the cracking time is 50 minutes. The liquid state product can be made into needing oil by fractionating. Moreover, the gas state and solid state products can be given up directly or treated further by the conventional method. In this example, the heat carrier was heated at the furnace and transported into the reactor. Then the heat carrier supplied a quantity of heat for the cracking process. The cracking gas can get combustible gas and oil by fractionating. What's more, the combustible gas, which was desulfurized by the conventional desulfurization method, can be directly expelled into or stored and then expelled into the heating furnace for burning. The rest parts exercise the same as the existing technologies.

EXAMPLE 18

The components and weight percentage of the catalyzer are as following: the model of molecular sieve is Y, and the weight percentage is 46. The active alumina is 26 wt %, the zinc oxide is 20 wt %, the active argil is 13 wt % and the kaoline is 14 wt %. The steel wires were separated from rubber by drawing the waste rubber into thread, and then the big pieces of rubber were broken up into granule. The weight ratio of catalyst and rubber is 3.5:1000, and then the mixture is transported into the reactor for the cracking reaction. The cracking temperature is 370° C., the cracking time is 60 minutes and the heating temperature difference in the cracking chamber is 2° C. The liquid state product can be made into needing oil by fractionating. Moreover, the gas state and solid state products can be given up directly or treated further by the conventional method. In this example, the heat carrier was heated at the furnace and transported into the reactor. Then the heat carrier supplied a quantity of heat for the cracking process. The cracking gas can get combustible gas and oil by fractionating. What's more, the combustible gas, which was desulfurized by the sodium hydroxide, can be directly expelled into or stored and then expelled into the heating furnace for burning. The rest parts exercise the same as the existing technologies.

EXAMPLE 19

The components and weight percentage of the catalyzer are as following: the model of molecular sieve is 3A, and the weight percentage is 47. The active alumina is 27 wt %, the zinc oxide is 15 wt %, the active argil is 15 wt % and the kaoline is 7 wt %. The weight ratio of catalyst and rubber is 2:1000, and then the mixture is transported into the reactor for the cracking reaction. The cracking temperature is 420° C. and the cracking time is 20 minutes. The liquid state product can be made into needing oil by fractionating. Moreover, the gas state and solid state products can be given up directly or treated further by the conventional method. In this example, the heat carrier was heated at the furnace, and following was transported into the reactor. Then the heat carrier supplied a quantity of heat for the cracking process. The cracking gas can get combustible gas and oil by fractionating. What's more, the combustible gas, which was desulfurized by the sodium hydroxide, can be directly expelled into or stored and then expelled into the heating furnace for burning. The rest parts exercise the same as the existing technologies.

EXAMPLE 20

The components and weight percentage of the catalyzer are as following: the model of molecular sieve is 4A, and the weight percentage is 48. The active alumina is 28 wt %, the zinc oxide is 15 wt %, the active argil is 5 wt % and the kaoline is 15 wt %. The weight ratio of catalyst and rubber is 4:1000, and then the mixture is transported into the reactor for the cracking reaction. The cracking temperature is 380° C. and the cracking time is 40 minutes. The liquid state product can be made into needing oil by fractionating. Moreover, the gas state and solid state products can be given up directly or treated further by the conventional method. In this example, the heat carrier was heated at the furnace and transported into the reactor. Then the heat carrier supplied a quantity of heat for the cracking process. The cracking gas can get combustible gas and oil by fractionating. What's more, the combustible gas, which was desulfurized by the conventional desulfurization method, can be directly expelled into or stored and then expelled into the heating furnace for burning. The rest parts exercise the same as the existing technologies.

EXAMPLE 21

The components and weight percentage of the catalyzer are as following: the model of molecular sieve is 5A, and the weight percentage is 49. The active alumina is 29 wt %, the zinc oxide is 19 wt %, the active argil is 10 wt % and the kaoline is 8 wt %. The weight ratio of catalyst and rubber is 4.5:1000, and then the mixture is transported into the reactor for the cracking reaction. The cracking temperature is 390° C. and the cracking time is 30 minutes. The liquid state product can be made into needing oil by fractionating. Moreover, the gas state and solid state products can be given up directly or treated further by the conventional method. In this example, the heat carrier was heated at the furnace and transported into the reactor. Then the heat carrier supplied a quantity of heat for the cracking process. The cracking gas can get combustible gas and oil by fractionating. What's more, the combustible gas, which was desulfurized by the conventional desulfurization method, can be directly expelled into or stored and then expelled into the heating furnace for burning. The rest parts exercise the same as the existing technologies.

EXAMPLE 22

The components and weight percentage of the catalyzer are as following: the model of molecular sieve is Y, and the weight percentage is 50. The active alumina is 30 wt %, the zinc oxide is 20 wt %, the active argil is 15 wt % and the kaoline is 5 wt %. The steel wires were separated from rubber by drawing the waste rubber into thread, and then the big pieces of rubber were broken up into granule. The weight ratio of catalyst and rubber is 2:1000, and then the mixture is transported into the reactor for the cracking reaction. The cracking temperature is 450° C., the cracking time is 10 minutes and the heating temperature difference in the cracking chamber is 5° C. The liquid state product can be made into needing oil by fractionating. Moreover, the gas state and solid state products can be given up directly or treated further by the conventional method. In this example, the heat carrier was heated at the furnace and transported into the reactor. Then the heat carrier supplied a quantity of heat for the cracking process. The cracking gas can get combustible gas and oil by fractionating. Moreover, the combustible gas, which was desulfurized by the conventional desulfurization method, can be directly expelled into or stored and then expelled into the heating furnace for burning. What's more, the temperature of the heat carrier can be adjusted at 485° C., which satisfy the temperature request for cracking. The rest parts exercise the same as the existing technologies.

EXAMPLE 23

The components and weight percentage of the catalyzer are as following: the model of molecular sieve is 3A, and the weight percentage is 40. The active alumina is 18 wt %, the zinc oxide is 12 wt %, the active argil is 7 wt % and the kaoline is 11 wt %. The weight ratio of catalyst and rubber is 3:1000, and then the mixture is transported into the reactor for the cracking reaction. The cracking temperature is 360° C. and the cracking time is 80 minutes. The liquid state product can be made into needing oil by fractionating. Moreover, the gas state and solid state products can be given up directly or treated further by the conventional method. In this example, the heat carrier was heated at the furnace and transported into the reactor. Then the heat carrier supplied a quantity of heat for the cracking process. The cracking gas can get combustible gas and oil by fractionating. What's more, the combustible gas, which was desulfurized by the conventional desulfurization method, can be directly expelled into or stored and then expelled into the heating furnace for burning. Moreover, the temperature of the heat carrier can be adjusted at 395° C., which satisfy the temperature request for cracking, and the heat carrier is the gas one. The rest parts exercise the same as the existing technologies.

EXAMPLE 24

The components and weight percentage of the catalyzer are as following: the model of molecular sieve is 5A, and the weight percentage is 45. The active alumina is 20 wt %, the zinc oxide is 15 wt %, the active argil is 10 wt % and the kaoline is 8 wt %. The weight ratio of catalyst and rubber is 5:1000, and then the mixture is transported into the reactor for the cracking reaction. The cracking temperature is 350° C., the cracking time is 50 minutes and the heating temperature difference in the cracking chamber is 4° C. The liquid state product can be made into needing oil by fractionating. Moreover, the gas state and solid state products can be given up directly or treated further by the conventional method. In this example, the heat carrier was heated at the furnace and transported into the reactor. Then the heat carrier supplied a quantity of heat for the cracking process. The cracking gas can get combustible gas and oil by fractionating. What's more, the combustible gas, which was desulfurized by the sodium hydroxide, can be directly expelled into or stored and then expelled into the heating furnace for burning. Moreover, the temperature of the heat carrier can be adjusted at 390° C., which satisfy the temperature request for cracking, and the heat carrier is the solid one. The rest parts exercise the same as the existing technologies.

EXAMPLE 25

The components and weight percentage of the catalyzer are as following: the model of molecular sieve is 3A, and the weight percentage is 35. The active alumina is 28 wt %, the zinc oxide is 15 wt %, the active argil is 11 wt % and the kaoline is 9 wt %. The weight ratio of catalyst and rubber is 2.5:1000, and then the mixture is transported into the reactor for the cracking reaction. The cracking temperature is 381° C. and the cracking time is 55 minutes. The liquid state product can be made into needing oil by fractionating. Moreover, the gas state and solid state products can be given up directly or treated further by the conventional method. In this example, the heat carrier was heated at the furnace and transported into the reactor. Then the heat carrier supplied a quantity of heat for the cracking process. The cracking gas can get combustible gas and oil by fractionating. What's more, the combustible gas, which was desulfurized by the sodium hydroxide, can be directly expelled into or stored and then expelled into the heating furnace for burning. Moreover, the temperature of the heat carrier can be adjusted at 405° C., which satisfy the temperature request for cracking. The rest parts exercise the same as the existing technologies.

EXAMPLE 26

The components and weight percentage of the catalyzer are as following: the model of molecular sieve is 4A, and the weight percentage is 37. The active alumina is 25 wt %, the zinc oxide is 18 wt %, the active argil is 12 wt % and the kaoline is 14 wt %. The steel wires were separated from rubber by drawing the waste rubber into thread, and then the big pieces of rubber were broken up into granule. The weight ratio of catalyst and rubber is 5:1000, and then the mixture is transported into the reactor for the cracking reaction. The cracking temperature is 382° C. and the cracking time is 25 minutes. The liquid state product can be made into needing oil by fractionating. Moreover, the gas state and solid state products can be given up directly or treated further by the conventional method. In this example, the heat carrier was heated at the furnace and transported into the reactor. Then the heat carrier supplied a quantity of heat for the cracking process. The cracking gas can get combustible gas and oil by fractionating. What's more, the combustible gas, which was desulfurized by the sodium hydroxide, can be directly expelled into or stored and then expelled into the heating furnace for burning. Moreover, the temperature of the heat carrier can be adjusted at 405° C., which satisfy the temperature request for cracking. The rest parts exercise the same as the existing technologies.

EXAMPLE 27

The components and weight percentage of the catalyzer are as following: the model of molecular sieve is 3A, and the weight percentage is 36. The active alumina is 15 wt %, the zinc oxide is 12 wt %, the active argil is 15 wt % and the kaoline is 9 wt %. The weight ratio of catalyst and rubber is 2:1000, and then the mixture is transported into the reactor for the cracking reaction. The cracking temperature is 383° C. and the cracking time is 40 minutes. The liquid state product can be made into needing oil by fractionating. Moreover, the gas state and solid state products can be given up directly or treated further by the conventional method. In this example, the heat carrier was heated at the furnace and transported into the reactor. Then the heat carrier supplied a quantity of heat for the cracking process. The cracking gas can get combustible gas and oil by fractionating. What's more, the combustible gas, which was desulfurized by the sodium hydroxide, can be directly expelled into or stored and then expelled into the heating furnace for burning. Moreover, the temperature of the heat carrier can be adjusted at 408° C., which satisfy the temperature request for cracking. The rest parts exercise the same as the existing technologies.

EXAMPLE 28

The components and weight percentage of the catalyzer are as following: the model of molecular sieve is Y, and the weight percentage is 38. The active alumina is 22 wt %, the zinc oxide is 16 wt %, the active argil is 10 wt % and the kaoline is 12 wt %. The weight ratio of catalyst and rubber is 5:1000, and then the mixture is transported into the reactor for the cracking reaction. The cracking temperature is 384° C. and the cracking time is 35 minutes. The liquid state product can be made into needing oil by fractionating. Moreover, the gas state and solid state products can be given up directly or treated further by the conventional method. In this example, the heat carrier was heated at the furnace and transported into the reactor. Then the heat carrier supplied a quantity of heat for the cracking process. The cracking gas can get combustible gas and oil by fractionating. What's more, the combustible gas, which was desulfurized by the sodium hydroxide, can be directly expelled into or stored and then expelled into the heating furnace for burning. Moreover, the temperature of the heat carrier can be adjusted at 410° C., which satisfy the temperature request for cracking. The rest parts exercise the same as the existing technologies.

EXAMPLE 29

The components and weight percentage of the catalyzer are as following: the model of molecular sieve is 4A, and the weight percentage is 35. The active alumina is 15 wt %, the zinc oxide is 10 wt %, the active argil is 5 wt % and the kaoline is 5 wt %. The weight ratio of catalyst and rubber is 2:1000, and then the mixture is transported into the reactor for the cracking reaction. The cracking temperature is 450° C. and the cracking time is 10 minutes. The liquid state product can be made into needing oil by fractionating. Moreover, the gas state and solid state products can be given up directly or treated further by the conventional method. In this example, the heat carrier was heated at the furnace and transported into the reactor. Then the heat carrier supplied a quantity of heat for the cracking process. The cracking gas can get combustible gas and oil by fractionating. What's more, the combustible gas, which was desulfurized by the conventional desulfurization method, can be directly expelled into or stored and then expelled into the heating furnace for burning. The exhaust gas, making by burning the combustible gas, should be treated again and exhausted out. What's more, the secondary treating can adopt the following mode: refrigerating the exhaust gas below 70° C., then deal with it by the transaction layer of active carbon, active fiber and zeolite molecular sieve, respectively. The rest parts exercise the same as the existing technologies.

EXAMPLE 30

The components and weight percentage of the catalyzer are as following: the model of molecular sieve is 3A, and the weight percentage is 40. The active alumina is 18 wt %, the zinc oxide is 12 wt %, the active argil is 7 wt % and the kaoline is 11 wt %. The weight ratio of catalyst and rubber is 3:1000, and then the mixture is transported into the reactor for the cracking reaction. The cracking temperature is 360° C. and the cracking time is 80 minutes. The liquid state product can be made into needing oil by fractionating. Moreover, the gas state and solid state products can be given up directly or treated further by the conventional method. In this example, the heat carrier was heated at the furnace and transported into the reactor. Then the heat carrier supplied a quantity of heat for the cracking process. The cracking gas can get combustible gas and oil by fractionating. What's more, the combustible gas, which was desulfurized by the conventional desulfurization method, can be directly expelled into or stored and then expelled into the heating furnace for burning. The exhaust gas, making by burning the combustible gas, should be treated again and exhausted out. What's more, the secondary treating can adopt the following mode: refrigerating the exhaust gas below 68° C., then deal with it by the transaction layer of active carbon, active fiber and zeolite molecular sieve, respectively. The rest parts exercise the same as the existing technologies.

EXAMPLE 31

The components and weight percentage of the catalyzer are as following: the model of molecular sieve is 5A, and the weight percentage is 45. The active alumina is 20 wt %, the zinc oxide is 15 wt %, the active argil is 10 wt % and the kaoline is 8 wt %. The weight ratio of catalyst and rubber is 7:1000, and then the mixture is transported into the reactor for the cracking reaction. The cracking temperature is 350° C. and the cracking time is 50 minutes. The liquid state product can be made into needing oil by fractionating. Moreover, the gas state and solid state products can be given up directly or treated further by the conventional method. In this example, the heat carrier was heated at the furnace and transported into the reactor. Then the heat carrier supplied a quantity of heat for the cracking process. The cracking gas can get combustible gas and oil by fractionating. What's more, the combustible gas, which was desulfurized by the conventional desulfurization method, can be directly expelled into or stored and then expelled into the heating furnace for burning. The exhaust gas, making by burning the combustible gas, should be treated again and exhausted out. What's more, the secondary treating can adopt the following mode: refrigerating the exhaust gas below 65° C., then deal with it by the transaction layer of active carbon, active fiber and zeolite molecular sieve respectively, and the through speed of exhaust gas was controlled at 0.1 m/s. The rest parts exercise the same as the existing technologies.

EXAMPLE 32

The components and weight percentage of the catalyzer are as following: the model of molecular sieve is Y, and the weight percentage is 40. The active alumina is 27 wt %, the zinc oxide is 19 wt %, the active argil is 6 wt % and the kaoline is 5 wt %. The weight ratio of catalyst and rubber is 6.5:1000, and then the mixture is transported into the reactor for the cracking reaction. The cracking temperature is 385° C., the cracking time is 55 minutes and the heating temperature difference in the cracking chamber is 10° C. The liquid state product can be made into needing oil by fractionating. Moreover, the gas state and solid state products can be given up directly or treated further by the conventional method. In this example, the heat carrier was heated at the furnace and transported into the reactor. Then the heat carrier supplied a quantity of heat for the cracking process. The cracking gas can get combustible gas and oil by fractionating. What's more, the combustible gas, which was desulfurized by the sodium hydroxide, can be directly expelled into or stored and then expelled into the heating furnace for burning. The exhaust gas, making by burning the combustible gas, should be treated again and exhausted out. What's more, the secondary treating can adopt the following mode: refrigerating the exhaust gas below 60° C., then deal with it by the transaction layer of active carbon, active fiber and zeolite molecular sieve respectively, and the through speed of exhaust gas was controlled at 0.2 m/s. The rest parts exercise the same as the existing technologies.

EXAMPLE 33

The components and weight percentage of the catalyzer are as following: the model of molecular sieve is 5A, and the weight percentage is 37. The active alumina is 28 wt %, the zinc oxide is 11 wt %, the active argil is 5 wt % and the kaoline is 8 wt %. The weight ratio of catalyst and rubber is 4.8:1000, and then the mixture is transported into the reactor for the cracking reaction. The cracking temperature is 486° C., the cracking time is 35 minutes and the heating temperature difference in the cracking chamber is 3° C. The liquid state product can be made into needing oil by fractionating. Moreover, the gas state and solid state products can be given up directly or treated further by the conventional method. In this example, the heat carrier was heated at the furnace and transported into the reactor. Then the heat carrier supplied a quantity of heat for the cracking process. The cracking gas can get combustible gas and oil by fractionating. What's more, the combustible gas, which was desulfurized by the sodium hydroxide, can be directly expelled into or stored and then expelled into the heating furnace for burning. The exhaust gas, making by burning the combustible gas, should be treated again and exhausted out. What's more, the secondary treating can adopt the following mode: refrigerating the exhaust gas below 50° C., then deal with it by the transaction layer of active carbon, active fiber and zeolite molecular sieve respectively, and the following rate of exhaust gas was controlled at 0.4 m/s. The rest parts exercise the same as the existing technologies.

EXAMPLE 34

The components and weight percentage of the catalyzer are as following: the model of molecular sieve is 3A, and the weight percentage is 35. The active alumina is 30 wt %, the zinc oxide is 20 wt %, the active argil is 10 wt % and the kaoline is 8 wt %. The steel wires were separated from rubber by drawing the waste rubber into thread, and then the big pieces of rubber were broken up into granule. The weight ratio of catalyst and rubber is 3.2:1000, and then the mixture is transported into the reactor for the cracking reaction. The cracking temperature is 387° C. and the cracking time is 40 minutes. The liquid state product can be made into needing oil by fractionating. Moreover, the gas state and solid state products can be given up directly or treated further by the conventional method. In this example, the heat carrier was heated at the furnace and transported into the reactor. Then the heat carrier supplied a quantity of heat for the cracking process. The cracking gas can get combustible gas and oil by fractionating. What's more, the combustible gas, which was desulfurized by the conventional desulfurization method, can be directly expelled into or stored and then expelled into the heating furnace for burning. The exhaust gas, making by burning the combustible gas, should be treated again and exhausted out. What's more, the secondary treating can adopt the following mode: refrigerating the exhaust gas below 42° C., then deal with it by the transaction layer of active carbon, active fiber and zeolite molecular sieve respectively, and the through speed of exhaust gas was controlled at 0.5 m/s. The rest parts exercise the same as the existing technologies.

EXAMPLE 35

The components and weight percentage of the catalyzer are as following: the model of molecular sieve is 4A, and the weight percentage is 39. The active alumina is 21 wt %, the zinc oxide is 13 wt %, the active argil is 11 wt % and the kaoline is 11 wt %. The weight ratio of catalyst and rubber is 2.8:1000, and then the mixture is transported into the reactor for the cracking reaction. The cracking temperature is 388° C., the cracking time is 35 minutes and the heating temperature difference in the cracking chamber is 7° C. The liquid state product can be made into needing oil by fractionating. Moreover, the gas state and solid state products can be given up directly or treated further by the conventional method. In this example, the heat carrier was heated at the furnace and transported into the reactor. Then the heat carrier supplied a quantity of heat for the cracking process. The cracking gas can get combustible gas and oil by fractionating. What's more, the combustible gas, which was desulfurized by the conventional desulfurization method, can be directly expelled into or stored and then expelled into the heating furnace for burning. The exhaust gas, making by burning the combustible gas, should be treated again and exhausted out. What's more, the secondary treating can adopt the following mode: refrigerating the exhaust gas below 40° C., then deal with it by the transaction layer of active carbon, active fiber and zeolite molecular sieve respectively, and the following rate of exhaust gas was controlled at 0.6 m/s. The rest parts exercise the same as the existing technologies.

EXAMPLE 36

The components and weight percentage of the catalyzer are as following: the model of molecular sieve is Y, and the weight percentage is 43. The active alumina is 25 wt %, the zinc oxide is 10 wt %, the active argil is 8 wt % and the kaoline is 14 wt %. The weight ratio of catalyst and rubber is 2.5:1000, and then the mixture is transported into the reactor for the cracking reaction. The cracking temperature is 389° C. and the cracking time is 15 minutes. The liquid state product can be made into needing oil by fractionating. Moreover, the gas state and solid state products can be given up directly or treated further by the conventional method. In this example, the heat carrier was heated at the furnace and transported into the reactor. Then the heat carrier supplied a quantity of heat for the cracking process. The cracking gas can get combustible gas and oil by fractionating. What's more, the combustible gas, which was desulfurized by the conventional desulfurization method, can be directly expelled into or stored and then expelled into the heating furnace for burning. The exhaust gas, making by burning the combustible gas, should be treated again and exhausted out. What's more, the secondary treating can adopt the following mode: refrigerating the exhaust gas below 40° C., then deal with it by the transaction layer of active carbon, active fiber and zeolite molecular sieve respectively, and the through speed of exhaust gas was controlled at 0.7 m/s. Moreover, the temperature of the heat carrier can be adjusted at 430° C., which satisfy the temperature request for cracking. The rest parts exercise the same as the existing technologies.

EXAMPLE 37

The components and weight percentage of the catalyzer are as following: the model of molecular sieve is 3A, and the weight percentage is 40. The active alumina is 18 wt %, the zinc oxide is 12 wt %, the active argil is 7 wt % and the kaoline is 11 wt %. The weight ratio of catalyst and rubber is 3:1000, and then the mixture is transported into the reactor for the cracking reaction. The cracking temperature is 360° C. and the cracking time is 80 minutes. The liquid state product can be made into needing oil by fractionating. Moreover, the gas state and solid state products can be given up directly or treated further by the conventional method. In this example, the heat carrier was heated at the furnace and transported into the reactor. Then the heat carrier supplied a quantity of heat for the cracking process. The cracking gas can get combustible gas and oil by fractionating. What's more, the combustible gas, which was desulfurized by the conventional desulfurization method, can be directly expelled into or stored and then expelled into the heating furnace for burning. The exhaust gas, making by burning the combustible gas, should be treated again and exhausted out. What's more, the secondary treating can adopt the following mode: refrigerating the exhaust gas below 35° C., then deal with it by the transaction layer of active carbon, active fiber and zeolite molecular sieve respectively, and the following rate of exhaust gas was controlled at 0.8 m/s. Moreover, the temperature of the heat carrier can be adjusted at 395° C., which satisfy the temperature request for cracking. The rest parts exercise the same as the existing technologies.

EXAMPLE 38

The components and weight percentage of the catalyzer are as following: the model of molecular sieve is 4A, and the weight percentage is 45. The active alumina is 20 wt %, the zinc oxide is 15 wt %, the active argil is 10 wt % and the kaoline is 8 wt %. The weight ratio of catalyst and rubber is 5:1000, and then the mixture is transported into the reactor for the cracking reaction. The cracking temperature is 350° C., the cracking time is 50 minutes and the heating temperature difference in the cracking chamber is 6° C. The liquid state product can be made into needing oil by fractionating. Moreover, the gas state and solid state products can be given up directly or treated further by the conventional method. In this example, the heat carrier was heated at the furnace and transported into the reactor. Then the heat carrier supplied a quantity of heat for the cracking process. The cracking gas can get combustible gas and oil by fractionating. What's more, the combustible gas, which was desulfurized by the sodium hydroxide, can be directly expelled into or stored and then expelled into the heating furnace for burning. The exhaust gas, making by burning the combustible gas, should be treated again and exhausted out. What's more, the secondary treating can adopt the following mode: refrigerating the exhaust gas below 58° C., then deal with it by the transaction layer of active carbon, active fiber and zeolite molecular sieve respectively, and the through speed of exhaust gas was controlled at 0.9 m/s. Moreover, the temperature of the heat carrier can be adjusted at 390° C., which satisfy the temperature request for cracking. The rest parts exercise the same as the existing technologies.

EXAMPLE 39

The components and weight percentage of the catalyzer are as following: the model of molecular sieve is 3A, and the weight percentage is 44. The active alumina is 27 wt %, the zinc oxide is 12 wt %, the active argil is 10 wt % and the kaoline is 14 wt %. The weight ratio of catalyst and rubber is 3.4:1000, and then the mixture is transported into the reactor for the cracking reaction. The cracking temperature is 390° C., the cracking time is 58 minutes and the heating temperature difference in the cracking chamber is 1° C. The liquid state product can be made into needing oil by fractionating. Moreover, the gas state and solid state products can be given up directly or treated further by the conventional method. In this example, the heat carrier was heated at the furnace and transported into the reactor. Then the heat carrier supplied a quantity of heat for the cracking process. The cracking gas can get combustible gas and oil by fractionating. What's more, the combustible gas, which was desulfurized by the sodium hydroxide, can be directly expelled into or stored and then expelled into the heating furnace for burning. The exhaust gas, making by burning the combustible gas, should be treated again and exhausted out. What's more, the secondary treating can adopt the following mode: refrigerating the exhaust gas below 45° C., then deal with it by the transaction layer of active carbon, active fiber and zeolite molecular sieve respectively, and the following rate of exhaust gas was controlled at 1 m/s. Moreover, the temperature of the heat carrier can be adjusted at 425° C., which satisfy the temperature request for cracking. The rest parts exercise the same as the existing technologies.

EXAMPLE 40

The components and weight percentage of the catalyzer are as following: the model of molecular sieve is 5A, and the weight percentage is 45. The active alumina is 20 wt %, the zinc oxide is 15 wt %, the active argil is 10 wt % and the kaoline is 8 wt %. The steel wires were separated from rubber by drawing the waste rubber into thread, and then the big pieces of rubber were broken up into granule. The weight ratio of catalyst and rubber is 5:1000, and then the mixture is transported into the reactor for the cracking reaction. The cracking temperature is 395° C. and the cracking time is 20 minutes. The liquid state product can be made into needing oil by fractionating. Moreover, the gas state and solid state products can be given up directly or treated further by the conventional method. In this example, the heat carrier was heated at the furnace and transported into the reactor. Then the heat carrier supplied a quantity of heat for the cracking process. The cracking gas can get combustible gas and oil by fractionating. What's more, the combustible gas, which was desulfurized by the sodium hydroxide, can be directly expelled into or stored and then expelled into the heating furnace for burning. The exhaust gas, making by burning the combustible gas, should be treated again and exhausted out. What's more, the secondary treating can adopt the following mode: refrigerating the exhaust gas below 55° C., then deal with it by the transaction layer of active carbon, active fiber and zeolite molecular sieve respectively, and the through speed of exhaust gas was controlled at 1.1 m/s. Moreover, the temperature of the heat carrier can be adjusted at 450° C., which satisfy the temperature request for cracking. The rest parts exercise the same as the existing technologies.

EXAMPLE 41

The components and weight percentage of the catalyzer are as following: the model of molecular sieve is 5A, and the weight percentage is 43. The active alumina is 15 wt %, the zinc oxide is 20 wt %, the active argil is 10 wt % and the kaoline is 15 wt %. The steel wires were separated from rubber by drawing the waste rubber into thread, and then the big pieces of rubber were broken up into granule. The weight ratio of catalyst and rubber is 6.5:1000, and then the mixture is transported into the reactor for the cracking reaction. The cracking temperature is 400° C. and the cracking time is 35 minutes. The liquid state product can be made into needing oil by fractionating. Moreover, the gas state and solid state products can be given up directly or treated further by the conventional method. In this example, the heat carrier was heated at the furnace and transported into the reactor. Then the heat carrier supplied a quantity of heat for the cracking process. The cracking gas can get combustible gas and oil by fractionating. What's more, the combustible gas, which was desulfurized by the sodium hydroxide, can be directly expelled into or stored and then expelled into the heating furnace for burning. The exhaust gas, making by burning the combustible gas, should be treated again and exhausted out. What's more, the secondary treating can adopt the following mode: refrigerating the exhaust gas below 48° C., then deal with it by the transaction layer of active carbon, active fiber and zeolite molecular sieve respectively, and the following rate of exhaust gas was controlled at 0.3 m/s. Moreover, the temperature of the heat carrier can be adjusted at 450° C., which satisfy the temperature request for cracking. The rest parts exercise the same as the existing technologies.

EXAMPLE 42

The components and weight percentage of the catalyzer are as following: the model of molecular sieve is Y, and the weight percentage is 37. The active alumina is 20 wt %, the zinc oxide is 20 wt %, the active argil is 6 wt % and the kaoline is 9 wt %. The weight ratio of catalyst and rubber is 5:1000, and then the mixture is transported into the reactor for the cracking reaction. The cracking temperature is 405° C. and the cracking time is 30 minutes. The liquid state product can be made into needing oil by fractionating. Moreover, the gas state and solid state products can be given up directly or treated further by the conventional method. In this example, the heat carrier was heated at the furnace and transported into the reactor. Then the heat carrier supplied a quantity of heat for the cracking process. The cracking gas can get combustible gas and oil by fractionating. What's more, the combustible gas, which was desulfurized by the sodium hydroxide, can be directly expelled into or stored and then expelled into the heating furnace for burning. The exhaust gas, making by burning the combustible gas, should be treated again and exhausted out. What's more, the secondary treating can adopt the following mode: refrigerating the exhaust gas below 52° C., then deal with it by the transaction layer of active carbon, active fiber and zeolite molecular sieve respectively, and the through speed of exhaust gas was controlled at 0.5 m/s. Moreover, the temperature of the heat carrier can be adjusted at 440° C., which satisfy the temperature request for cracking. The rest parts exercise the same as the existing technologies.

EXAMPLE 43

The components and weight percentage of the catalyzer are as following: the model of molecular sieve is Y, and the weight percentage is 35. The active alumina is 15 wt %, the zinc oxide is 10 wt %, the active argil is 5 wt % and the kaoline is 5 wt %. The weight ratio of catalyst and rubber is 2:1000, and then the mixture is transported into the reactor for the cracking reaction. The cracking temperature is 450° C., the cracking time is 10 minutes and the heating temperature difference in the cracking chamber is 10° C. The liquid state product can be made into needing oil by fractionating. Moreover, the gas state and solid state products can be given up directly or treated further by the conventional method. The solid state product, which produced after cracking, contains carbon black. And it can be made into carbon black by the procedure of magnetic separation, comminution and selection by winnowing. The rest parts exercise the same as the existing technologies.

EXAMPLE 44

The components and weight percentage of the catalyzer are as following: the model of molecular sieve is 3A, and the weight percentage is 40. The active alumina is 18 wt %, the zinc oxide is 12 wt %, the active argil is 7 wt % and the kaoline is 11 wt %. The weight ratio of catalyst and rubber is 3:1000, and then the mixture is transported into the reactor for the cracking reaction. The cracking temperature is 360° C. and the cracking time is 80 minutes. The liquid state product can be made into needing oil by fractionating. Moreover, the gas state and solid state products can be given up directly or treated further by the conventional method. The solid state product, which produced after cracking, contains carbon black. And it can be made into carbon black by the procedure of magnetic separation, comminution and selection by winnowing. The rest parts exercise the same as the existing technologies.

EXAMPLE 45

The components and weight percentage of the catalyzer are as following: the model of molecular sieve is 4A, and the weight percentage is 45. The active alumina is 20 wt %, the zinc oxide is 15 wt %, the active argil is 10 wt % and the kaoline is 8 wt %. The weight ratio of catalyst and rubber is 5:1000, and then the mixture is transported into the reactor for the cracking reaction. The cracking temperature is 350° C. and the cracking time is 50 minutes. The liquid state product can be made into needing oil by fractionating. Moreover, the gas state and solid state products can be given up directly or treated further by the conventional method. The solid state product, which produced after cracking, contains carbon black. And it can be made into carbon black by the procedure of magnetic separation, comminution and selection by winnowing. The rest parts exercise the same as the existing technologies.

EXAMPLE 46

The components and weight percentage of the catalyzer are as following: the model of molecular sieve is 5A, and the weight percentage is 36. The active alumina is 21 wt %, the zinc oxide is 14 wt %, the active argil is 7 wt % and the kaoline is 7 wt %. The steel wires were separated from rubber by drawing the waste rubber into thread, and then the big pieces of rubber were broken up into granule. The weight ratio of catalyst and rubber is 6:1000, and then the mixture is transported into the reactor for the cracking reaction. The cracking temperature is 410° C. and the cracking time is 45 minutes. The liquid state product can be made into needing oil by fractionating. Moreover, the gas state and solid state products can be given up directly or treated further by the conventional method. The solid state product, which produced after cracking, contains carbon black. And it can be made into carbon black by the procedure of magnetic separation, comminution and selection by winnowing. The rest parts exercise the same as the existing technologies.

EXAMPLE 47

The components and weight percentage of the catalyzer are as following: the model of molecular sieve is Y, and the weight percentage is 38. The active alumina is 29 wt %, the zinc oxide is 14 wt %, the active argil is 10 wt % and the kaoline is 12 wt %. The weight ratio of catalyst and rubber is 5:1000, and then the mixture is transported into the reactor for the cracking reaction. The cracking temperature is 415° C. and the cracking time is 25 minutes. The liquid state product can be made into needing oil by fractionating. Moreover, the gas state and solid state products can be given up directly or treated further by the conventional method. The solid state product, which produced after cracking, contains carbon black. And it can be made into carbon black by the procedure of magnetic separation, comminution and selection by winnowing. The rest parts exercise the same as the existing technologies.

EXAMPLE 48

The components and weight percentage of the catalyzer are as following: the model of molecular sieve is 3A, and the weight percentage is 49. The active alumina is 17 wt %, the zinc oxide is 15 wt %, the active argil is 14 wt % and the kaoline is 6 wt %. The weight ratio of catalyst and rubber is 2.2:1000, and then the mixture is transported into the reactor for the cracking reaction. The cracking temperature is 420° C. and the cracking time is 35 minutes. The liquid state product can be made into needing oil by fractionating. Moreover, the gas state and solid state products can be given up directly or treated further by the conventional method. The solid state product, which produced after cracking, contains carbon black. And it can be made into carbon black by the procedure of magnetic separation, comminution and selection by winnowing. The rest parts exercise the same as the existing technologies.

EXAMPLE 49

The components and weight percentage of the catalyzer are as following: the model of molecular sieve is 3A, and the weight percentage is 45. The active alumina is 20 wt %, the zinc oxide is 15 wt %, the active argil is 14 wt % and the kaoline is 8 wt %. The weight ratio of catalyst and rubber is 6.7:1000, and then the mixture is transported into the reactor for the cracking reaction. The cracking temperature is 425° C. and the cracking time is 34 minutes. The liquid state product can be made into needing oil by fractionating. Moreover, the gas state and solid state products can be given up directly or treated further by the conventional method. The solid state product, which produced after cracking, contains carbon black. And it can be made into carbon black by the procedure of magnetic separation, comminution and selection by winnowing. The rest parts exercise the same as the existing technologies.

EXAMPLE 50

The components and weight percentage of the catalyzer are as following: the model of molecular sieve is 4A, and the weight percentage is 38. The active alumina is 25 wt %, the zinc oxide is 13 wt %, the active argil is 15 wt % and the kaoline is 15 wt %. The weight ratio of catalyst and rubber is 5.5:1000, and then the mixture is transported into the reactor for the cracking reaction. The cracking temperature is 430° C. and the cracking time is 25 minutes. The liquid state product can be made into needing oil by fractionating. Moreover, the gas state and solid state products can be given up directly or treated further by the conventional method. The solid state product, which produced after cracking, contains carbon black. And it can be made into carbon black by the procedure of magnetic separation, comminution and selection by winnowing. Moreover, the temperature of the heat carrier can be adjusted at 455° C., which satisfy the temperature request for cracking. The rest parts exercise the same as the existing technologies.

EXAMPLE 51

The components and weight percentage of the catalyzer are as following: the model of molecular sieve is Y, and the weight ratio is 40. The active alumina is 18 wt %, the zinc oxide is 12 wt %, the active argil is 7 wt % and the kaoline is 11 wt %. The weight ratio of catalyst and rubber is 3:1000, and then the mixture is transported into the reactor for the cracking reaction. The cracking temperature is 360° C. and the cracking time is 80 minutes. The liquid state product can be made into needing oil by fractionating. Moreover, the gas state and solid state products can be given up directly or treated further by the conventional method. The solid state product, which produced after cracking, contains carbon black. And it can be made into carbon black by the procedure of magnetic separation, comminution and selection by winnowing. Moreover, the temperature of the heat carrier can be adjusted at 395° C., which satisfy the temperature request for cracking. The rest parts exercise the same as the existing technologies.

EXAMPLE 52

The components and weight percentage of the catalyzer are as following: the model of molecular sieve is 4A, and the weight percentage is 45. The active alumina is 20 wt %, the zinc oxide is 15 wt %, the active argil is 10 wt % and the kaoline is 8 wt %. The weight ratio of catalyst and rubber is 2.5:1000, and then the mixture is transported into the reactor for the cracking reaction. The cracking temperature is 350° C., the cracking time is 50 minutes and the heating temperature difference in the cracking chamber is 5° C. The liquid state product can be made into needing oil by fractionating. Moreover, the gas state and solid state products can be given up directly or treated further by the conventional method. The solid state product, which produced after cracking, contains carbon black. And it can be made into carbon black by the procedure of magnetic separation, comminution and selection by winnowing. Moreover, the temperature of the heat carrier can be adjusted at 380° C., which satisfy the temperature request for cracking. The rest parts exercise the same as the existing technologies.

EXAMPLE 53

The components and weight percentage of the catalyzer are as following: the model of molecular sieve is 3A, and the weight percentage is 50. The active alumina is 21 wt %, the zinc oxide is 17 wt %, the active argil is 11 wt % and the kaoline is 13 wt %. The weight ratio of catalyst and rubber is 4.5:1000, and then the mixture is transported into the reactor for the cracking reaction. The cracking temperature is 435° C., the cracking time is 25 minutes and the heating temperature difference in the cracking chamber is 4° C. The liquid state product can be made into needing oil by fractionating. Moreover, the gas state and solid state products can be given up directly or treated further by the conventional method. The solid state product, which produced after cracking, contains carbon black. And it can be made into carbon black by the procedure of magnetic separation, comminution and selection by winnowing. Moreover, the temperature of the heat carrier can be adjusted at 460° C., which satisfy the temperature request for cracking. The rest parts exercise the same as the existing technologies.

EXAMPLE 54

The components and weight percentage of the catalyzer are as following: the model of molecular sieve is Y, and the weight percentage is 37. The active alumina is 28 wt %, the zinc oxide is 18 wt %, the active argil is 8 wt % and the kaoline is 11 wt %. The steel wires were separated from rubber by drawing the waste rubber into thread, and then the big pieces of rubber were broken up into granule. The weight ratio of catalyst and rubber is 5:1000, and then the mixture is transported into the reactor for the cracking reaction. The cracking temperature is 440° C., the cracking time is 20 minutes and the heating temperature difference in the cracking chamber is 8° C. The liquid state product can be made into needing oil by fractionating. Moreover, the gas state and solid state products can be given up directly or treated further by the conventional method. The solid state product, which produced after cracking, contains carbon black. And it can be made into carbon black by the procedure of magnetic separation, comminution and selection by winnowing. Moreover, the temperature of the heat carrier can be adjusted at 465° C., which satisfy the temperature request for cracking. The rest parts exercise the same as the existing technologies.

EXAMPLE 55

The components and weight percentage of the catalyzer are as following: the model of molecular sieve is 5A, and the weight percentage is 40. The active alumina is 26 wt %, the zinc oxide is 17 wt %, the active argil is 14 wt % and the kaoline is 6 wt %. The weight ratio of catalyst and rubber is 6:1000, and then the mixture is transported into the reactor for the cracking reaction. The cracking temperature is 445° C. and the cracking time is 15 minutes. The liquid state product can be made into needing oil by fractionating. Moreover, the gas state and solid state products can be given up directly or treated further by the conventional method. The solid state product, which produced after cracking, contains carbon black. And it can be made into carbon black by the procedure of magnetic separation, comminution and selection by winnowing. Moreover, the temperature of the heat carrier can be adjusted at 480° C., which satisfy the temperature request for cracking. The rest parts exercise the same as the existing technologies.

EXAMPLE 56

The components and weight percentage of the catalyzer are as following: the model of molecular sieve is 5A, and the weight percentage is 43. The active alumina is 22 wt %, the zinc oxide is 11 wt %, the active argil is 5 wt % and the kaoline is 14 wt %. The weight ratio of catalyst and rubber is 4:1000, and then the mixture is transported into the reactor for the cracking reaction. The cracking temperature is 450° C. and the cracking time is 10 minutes. The liquid state product can be made into needing oil by fractionating. Moreover, the gas state and solid state products can be given up directly or treated further by the conventional method. The solid state product, which produced after cracking, contains carbon black. And it can be made into carbon black by the procedure of magnetic separation, comminution and selection by winnowing. Moreover, the temperature of the heat carrier can be adjusted at 490° C., which satisfy the temperature request for cracking. The rest parts exercise the same as the existing technologies.

EXAMPLE 57

The components and weight ratio of the catalyzer are as following: the model of molecular sieve is 4A, and the weight percentage is 44. The active alumina is 15 wt %, the zinc oxide is 10 wt %, the active argil is 5 wt % and the kaoline is 5 wt %. The steel wires were separated from rubber by drawing the waste rubber into thread, and then the big pieces of rubber were broken up into granule. The weight ratio of catalyst and rubber is 2:1000, and then the mixture is transported into the reactor for the cracking reaction. The cracking temperature is 450° C. and the cracking time is 10 minutes. The liquid state product can be made into needing oil by fractionating. Moreover, the solid state product, which produced after cracking, contains carbon black. And it can be made into carbon black by the procedure of magnetic separation, comminution and selection by winnowing. In this example, the heat carrier was heated at the furnace and transported into the reactor. Then the heat carrier supplied a quantity of heat for the cracking process. The cracking gas can get combustible gas and oil by fractionating. What's more, the combustible gas, which was desulfurized by the conventional desulfurization method, can be directly expelled into or stored and then expelled into the heating furnace for burning. The rest parts exercise the same as the existing technologies.

EXAMPLE 58

The components and weight percentage of the catalyzer are as following: the model of molecular sieve is Y, and the weight percentage is 40. The active alumina is 18 wt %, the zinc oxide is 12 wt %, the active argil is 7 wt % and the kaoline is 11 wt %. The steel wires were separated from rubber by drawing the waste rubber into thread, and then the big pieces of rubber were broken up into granule. The weight ratio of catalyst and rubber is 3:1000, and then the mixture is transported into the reactor for the cracking reaction. The cracking temperature is 350° C., the cracking time is 80 minutes and the heating temperature difference in the cracking chamber is 2° C. The liquid state product can be made into needing oil by fractionating. Moreover, the solid state product, which produced after cracking, contains carbon black. And it can be made into carbon black, which can pass the screen of 650 mesh, by the procedure of magnetic separation, comminution and selection by winnowing. In this example, the heat carrier was heated at the furnace and transported into the reactor. Then the heat carrier supplied a quantity of heat for the cracking process. The cracking gas can get combustible gas and oil by fractionating. What's more, the combustible gas, which was desulfurized by the conventional desulfurization method, can be directly expelled into or stored and then expelled into the heating furnace for burning. The rest parts exercise the same as the existing technologies.

EXAMPLE 59

The components and weight percentage of the catalyzer are as following: the model of molecular sieve is 4A, and the weight percentage is 45. The active alumina is 30 wt %, the zinc oxide is 19 wt %, the active argil is 15 wt % and the kaoline is 15 wt %. The weight ratio of catalyst and rubber is 5.8:1000, and then the mixture is transported into the reactor for the cracking reaction. The cracking temperature is 355° C. and the cracking time is 75 minutes. The liquid state product can be made into needing oil by fractionating. Moreover, the solid state product, which produced after cracking, contains carbon black. And it can be made into carbon black, which can pass the screen of 700 mesh, by the procedure of magnetic separation, comminution and selection by winnowing. After accomplishing the aforementioned process, adding the carbon black into the stearic acid. And make it, mixing with the remanent components, into zinc stearate, which can reinforce the role of carbon black. In this example, the heat carrier was heated at the furnace and transported into the reactor. Then the heat carrier supplied a quantity of heat for the cracking process. The cracking gas can get combustible gas and oil by fractionating. What's more, the combustible gas, which was desulfurized by the conventional desulfurization method, can be directly expelled into or stored and then expelled into the heating furnace for burning. The rest parts exercise the same as the existing technologies.

EXAMPLE 60

The components and weight percentage of the catalyzer are as following: the model of molecular sieve is Y, and the weight percentage is 45. The active alumina is 20 wt %, the zinc oxide is 10 wt %, the active argil is 5 wt % and the kaoline is 15 wt %. The steel wires were separated from rubber by drawing the waste rubber into thread, and then the big pieces of rubber were broken up into granule. The weight ratio of catalyst and rubber is 7:1000, and then the mixture is transported into the reactor for the cracking reaction. The cracking temperature is 360° C. and the cracking time is 60 minutes. The liquid state product can be made into needing oil by fractionating. Moreover, the solid state product, which produced after cracking, contains carbon black. And it can be made into carbon black by the procedure of magnetic separation, comminution and selection by winnowing. After accomplishing the aforementioned process, adding the carbon black into the stearic acid. And make it, mixing with the remanent components, into zinc stearate, which can reinforce the role of carbon black. In this example, the heat carrier was heated at the furnace and transported into the reactor. Then the heat carrier supplied a quantity of heat for the cracking process. The cracking gas can get combustible gas and oil by fractionating. What's more, the combustible gas, which was desulfurized by the sodium hydroxide, can be directly expelled into or stored and then expelled into the heating furnace for burning. The rest parts exercise the same as the existing technologies.

EXAMPLE 61

The components and weight percentage of the catalyzer are as following: the model of molecular sieve is 3A, and the weight percentage is 45. The active alumina is 22 wt %, the zinc oxide is 20 wt %, the active argil is 7 wt % and the kaoline is 10 wt %. The weight ratio of catalyst and rubber is 6.5:1000, and then the mixture is transported into the reactor for the cracking reaction. The cracking temperature is 365° C. and the cracking time is 55 minutes. The liquid state product can be made into needing oil by fractionating. Moreover, the solid state product, which produced after cracking, contains carbon black. And it can be made into carbon black, which can pass the screen of 650 mesh, by the procedure of magnetic separation, comminution and selection by winnowing. After accomplishing the aforementioned process, adding the carbon black into the stearic acid. And make it, mixing with the remanent components, into zinc stearate, which can reinforce the role of carbon black. In this example, the heat carrier was heated at the furnace and transported into the reactor. Then the heat carrier supplied a quantity of heat for the cracking process. The cracking gas can get combustible gas and oil by fractionating. What's more, the combustible gas, which was desulfurized by the sodium hydroxide, can be directly expelled into or stored and then expelled into the heating furnace for burning. The rest parts exercise the same as the existing technologies.

EXAMPLE 62

The components and weight percentage of the catalyzer are as following: the model of molecular sieve is Y, and the weight percentage is 49. The active alumina is 29 wt %, the zinc oxide is 19 wt %, the active argil is 14 wt % and the kaoline is 15 wt %. The weight ratio of catalyst and rubber is 2:1000, and then the mixture is transported into the reactor for the cracking reaction. The cracking temperature is 370° C. and the cracking time is 50 minutes. The liquid state product can be made into needing oil by fractionating. Moreover, the solid state product, which produced after cracking, contains carbon black. And it can be made into carbon black by the procedure of magnetic separation, comminution and selection by winnowing. In this example, the heat carrier was heated at the furnace and transported into the reactor. Then the heat carrier supplied a quantity of heat for the cracking process. The cracking gas can get combustible gas and oil by fractionating. What's more, the combustible gas, which was desulfurized by the conventional desulfurization method, can be directly expelled into or stored and then expelled into the heating furnace for burning. The rest parts exercise the same as the existing technologies.

EXAMPLE 63

The components and weight percentage of the catalyzer are as following: the model of molecular sieve is 5A, and the weight percentage is 36. The active alumina is 27 wt %, the zinc oxide is 15 wt %, the active argil is 5 wt % and the kaoline is 8 wt %. The weight ratio of catalyst and rubber is 5.5:1000, and then the mixture is transported into the reactor for the cracking reaction. The cracking temperature is 375° C., the cracking time is 45 minutes and the heating temperature difference in the cracking chamber is 5° C. The liquid state product can be made into needing oil by fractionating. Moreover, the solid state product, which produced after cracking, contains carbon black. And it can be made into carbon black by the procedure of magnetic separation, comminution and selection by winnowing. After accomplishing the aforementioned process, adding the carbon black into the stearic acid. And make it, mixing with the remanent components, into zinc stearate, which can reinforce the role of carbon black. In this example, the heat carrier was heated at the furnace and transported into the reactor. Then the heat carrier supplied a quantity of heat for the cracking process. The cracking gas can get combustible gas and oil by fractionating. What's more, the combustible gas, which was desulfurized by the conventional desulfurization method, can be directly expelled into or stored and then expelled into the heating furnace for burning. The rest parts exercise the same as the existing technologies.

EXAMPLE 64

The components and weight percentage of the catalyzer are as following: the model of molecular sieve is 3A, and the weight percentage is 35. The active alumina is 20 wt %, the zinc oxide is 10 wt %, the active argil is 5 wt % and the kaoline is 5 wt %. The steel wires were separated from rubber by drawing the waste rubber into thread, and then the big pieces of rubber were broken up into granule. The weight ratio of catalyst and rubber is 7:1000, and then the mixture is transported into the reactor for the cracking reaction. The cracking temperature is 380° C., the cracking time is 40 minutes and the heating temperature difference in the cracking chamber is 6° C. The liquid state product can be made into needing oil by fractionating. Moreover, the solid state product, which produced after cracking, contains carbon black. And it can be made into carbon black, which can pass the screen of 650 mesh, by the procedure of magnetic separation, comminution and selection by winnowing. After accomplishing the aforementioned process, adding the carbon black into the stearic acid. And make it, mixing with the remanent components, into zinc stearate, which can reinforce the role of carbon black. In this example, the heat carrier was heated at the furnace and transported into the reactor. Then the heat carrier supplied a quantity of heat for the cracking process. The cracking gas can get combustible gas and oil by fractionating. What's more, the combustible gas, which was desulfurized by the conventional desulfurization method, can be directly expelled into or stored and then expelled into the heating furnace for burning. Moreover, the temperature of the heat carrier can be adjusted at 415° C., which satisfy the temperature request for cracking. The rest parts exercise the same as the existing technologies.

EXAMPLE 65

The components and weight percentage of the catalyzer are as following: the model of molecular sieve is Y, and the weight percentage is 40. The active alumina is 28 wt %, the zinc oxide is 20 wt %, the active argil is 7 wt % and the kaoline is 11 wt %. The steel wires were separated from rubber by drawing the waste rubber into thread, and then the big pieces of rubber were broken up into granule. The weight ratio of catalyst and rubber is 5.3:1000, and then the mixture is transported into the reactor for the cracking reaction. The cracking temperature is 360° C. and the cracking time is 75 minutes. The liquid state product can be made into needing oil by fractionating. Moreover, the solid state product, which produced after cracking, contains carbon black. And it can be made into carbon black by the procedure of magnetic separation, comminution and selection by winnowing. In this example, the heat carrier was heated at the furnace and transported into the reactor. Then the heat carrier supplied a quantity of heat for the cracking process. The cracking gas can get combustible gas and oil by fractionating. What's more, the combustible gas, which was desulfurized by the conventional desulfurization method, can be directly expelled into or stored and then expelled into the heating furnace for burning. Moreover, the temperature of the heat carrier can be adjusted at 390° C., which satisfy the temperature request for cracking. The rest parts exercise the same as the existing technologies.

EXAMPLE 66

The components and weight percentage of the catalyzer are as following: the model of molecular sieve is 3A, and the weight percentage is 35. The active alumina is 20 wt %, the zinc oxide is 15 wt %, the active argil is 14 wt % and the kaoline is 12 wt %. The weight ratio of catalyst and rubber is 6.5:1000, and then the mixture is transported into the reactor for the cracking reaction. The cracking temperature is 350° C. and the cracking time is 60 minutes. The liquid state product can be made into needing oil by fractionating. Moreover, the solid state product, which produced after cracking, contains carbon black. And it can be made into carbon black by the procedure of magnetic separation, comminution and selection by winnowing. In this example, the heat carrier was heated at the furnace and transported into the reactor. Then the heat carrier supplied a quantity of heat for the cracking process. The cracking gas can get combustible gas and oil by fractionating. What's more, the combustible gas, which was desulfurized by the sodium hydroxide, can be directly expelled into or stored and then expelled into the heating furnace for burning. Moreover, the temperature of the heat carrier can be adjusted at 385° C., which satisfy the temperature request for cracking. The rest parts exercise the same as the existing technologies.

EXAMPLE 67

The components and weight percentage of the catalyzer are as following: the model of molecular sieve is Y, and the weight percentage is 35. The active alumina is 30 wt %, the zinc oxide is 20 wt %, the active argil is 10 wt % and the kaoline is 15 wt %. The steel wires were separated from rubber by drawing the waste rubber into thread, and then the big pieces of rubber were broken up into granule. The weight ratio of catalyst and rubber is 3.5:1000, and then the mixture is transported into the reactor for the cracking reaction. The cracking temperature is 370° C. and the cracking time is 60 minutes. The liquid state product can be made into needing oil by fractionating. Moreover, the solid state product, which produced after cracking, contains carbon black. And it can be made into carbon black by the procedure of magnetic separation, comminution and selection by winnowing. In this example, the heat carrier was heated at the furnace and transported into the reactor. Then the heat carrier supplied a quantity of heat for the cracking process. The cracking gas can get combustible gas and oil by fractionating. What's more, the combustible gas, which was desulfurized by the sodium hydroxide, can be directly expelled into or stored and then expelled into the heating furnace for burning. Moreover, the temperature of the heat carrier can be adjusted at 400° C., which satisfy the temperature request for cracking. The rest parts exercise the same as the existing technologies.

EXAMPLE 68

The components and weight percentage of the catalyzer are as following: the model of molecular sieve is 4A, and the weight percentage is 47. The active alumina is 26 wt %, the zinc oxide is 13 wt %, the active argil is 10 wt % and the kaoline is 8 wt %. The weight ratio of catalyst and rubber is 5:1000, and then the mixture is transported into the reactor for the cracking reaction. The cracking temperature is 420° C., the cracking time is 20 minutes and the heating temperature difference in the cracking chamber is 2° C. The liquid state product can be made into needing oil by fractionating. Moreover, the solid state product, which produced after cracking, contains carbon black. And it can be made into carbon black by the procedure of magnetic separation, comminution and selection by winnowing. In this example, the heat carrier was heated at the furnace and transported into the reactor. Then the heat carrier supplied a quantity of heat for the cracking process. The cracking gas can get combustible gas and oil by fractionating. What's more, the combustible gas, which was desulfurized by the sodium hydroxide, can be directly expelled into or stored and then expelled into the heating furnace for burning. Moreover, the temperature of the heat carrier can be adjusted at 450° C., which satisfy the temperature request for cracking. The rest parts exercise the same as the existing technologies.

EXAMPLE 69

The components and weight percentage of the catalyzer are as following: the model of molecular sieve is 5A, and the weight percentage is 36. The active alumina is 20 wt %, the zinc oxide is 15 wt %, the active argil is 8 wt % and the kaoline is 8 wt %. The weight ratio of catalyst and rubber is 5.5:1000, and then the mixture is transported into the reactor for the cracking reaction. The cracking temperature is 385° C. and the cracking time is 40 minutes. The liquid state product can be made into needing oil by fractionating. Moreover, the solid state product, which produced after cracking, contains carbon black. And it can be made into carbon black by the procedure of magnetic separation, comminution and selection by winnowing. In this example, the heat carrier was heated at the furnace and transported into the reactor. Then the heat carrier supplied a quantity of heat for the cracking process. The cracking gas can get combustible gas and oil by fractionating. What's more, the combustible gas, which was desulfurized by the sodium hydroxide, can be directly expelled into or stored and then expelled into the heating furnace for burning. Moreover, the temperature of the heat carrier can be adjusted at 405° C., which satisfy the temperature request for cracking. The rest parts exercise the same as the existing technologies.

EXAMPLE 70

The components and weight percentage of the catalyzer are as following: the model of molecular sieve is Y, and the weight percentage is 37. The active alumina is 17 wt %, the zinc oxide is 10 wt %, the active argil is 10 wt % and the kaoline is 8 wt %. The weight ratio of catalyst and rubber is 6.5:1000, and then the mixture is transported into the reactor for the cracking reaction. The cracking temperature is 390° C., the cracking time is 30 minutes and the heating temperature difference in the cracking chamber is 7° C. The liquid state product can be made into needing oil by fractionating. Moreover, the solid state product, which produced after cracking, contains carbon black. And it can be made into carbon black by the procedure of magnetic separation, comminution and selection by winnowing. In this example, the heat carrier was heated at the furnace and transported into the reactor. Then the heat carrier supplied a quantity of heat for the cracking process. The cracking gas can get combustible gas and oil by fractionating. What's more, the combustible gas, which was desulfurized by the sodium hydroxide, can be directly expelled into or stored and then expelled into the heating furnace for burning. Moreover, the temperature of the heat carrier can be adjusted at 420° C., which satisfy the temperature request for cracking. The rest parts exercise the same as the existing technologies.

EXAMPLE 71

The components and weight percentage of the catalyzer are as following: the model of molecular sieve is Y, and the weight percentage is 38. The active alumina is 25 wt %, the zinc oxide is 10 wt %, the active argil is 10 wt % and the kaoline is 5 wt %. The weight ratio of catalyst and rubber is 5.5:1000, and then the mixture is transported into the reactor for the cracking reaction. The cracking temperature is 450° C., the cracking time is 10 minutes and the heating temperature difference in the cracking chamber is 1° C. The liquid state product can be made into needing oil by fractionating. Moreover, the solid state product, which produced after cracking, contains carbon black. And it can be made into carbon black by the procedure of magnetic separation, comminution and selection by winnowing. In this example, the heat carrier was heated at the furnace and transported into the reactor. Then the heat carrier supplied a quantity of heat for the cracking process. The cracking gas can get combustible gas and oil by fractionating. What's more, the combustible gas, which was desulfurized by the conventional desulfurization method, can be directly expelled into or stored and then expelled into the heating furnace for burning. The exhaust gas, making by burning the combustible gas, should be treated again and exhausted out. What's more, the secondary treating can adopt the following mode: refrigerating the exhaust gas below 40° C., then deal with it by the transaction layer of active carbon, active fiber and zeolite molecular sieve, respectively. The rest parts exercise the same as the existing technologies.

EXAMPLE 72

The components and weight percentage of the catalyzer are as following: the model of molecular sieve is 3A, and the weight percentage is 40. The active alumina is 18 wt %, the zinc oxide is 12 wt %, the active argil is 7 wt % and the kaoline is 11 wt %. The weight ratio of catalyst and rubber is 3:1000, and then the mixture is transported into the reactor for the cracking reaction. The cracking temperature is 360° C. and the cracking time is 80 minutes. The liquid state product can be made into needing oil by fractionating. Moreover, the solid state product, which produced after cracking, contains carbon black. And it can be made into carbon black by the procedure of magnetic separation, comminution and selection by winnowing. In this example, the heat carrier was heated at the furnace and transported into the reactor. Then the heat carrier supplied a quantity of heat for the cracking process. The cracking gas can get combustible gas and oil by fractionating. What's more, the combustible gas, which was desulfurized by the conventional desulfurization method, can be directly expelled into or stored and then expelled into the heating furnace for burning. The exhaust gas, making by burning the combustible gas, should be treated again and exhausted out. What's more, the secondary treating can adopt the following mode: refrigerating the exhaust gas below 68° C., then deal with it by the transaction layer of active carbon, active fiber and zeolite molecular sieve, respectively. The rest parts exercise the same as the existing technologies.

EXAMPLE 73

The components and weight percentage of the catalyzer are as following: the model of molecular sieve is Y, and the weight percentage is 45. The active alumina is 20 wt %, the zinc oxide is 15 wt %, the active argil is 10 wt %, the kaoline is 8 wt %. The weight ratio of catalyst and rubber is 5:1000, and then the mixture is transported into the reactor for the cracking reaction. The cracking temperature is 350° C. and the cracking time is 50 minutes. The liquid state product can be made into needing oil by fractionating. Moreover, the solid state product, which produced after cracking, contains carbon black. And it can be made into carbon black by the procedure of magnetic separation, comminution and selection by winnowing. In this example, the heat carrier was heated at the furnace and transported into the reactor. Then the heat carrier supplied a quantity of heat for the cracking process. The cracking gas can get combustible gas and oil by fractionating. What's more, the combustible gas, which was desulfurized by the conventional desulfurization method, can be directly expelled into or stored and then expelled into the heating furnace for burning. The exhaust gas, making by burning the combustible gas, should be treated again and exhausted out. What's more, the secondary treating can adopt the following mode: refrigerating the exhaust gas below 65° C., then deal with it by the transaction layer of active carbon, active fiber and zeolite molecular sieve, respectively, and the following rate of exhaust gas was controlled at 0.1 m/s. The rest parts exercise the same as the existing technologies.

EXAMPLE 74

The components and weight percentage of the catalyzer are as following: the model of molecular sieve is 5A, and the weight percentage is 39. The active alumina is 19 wt %, the zinc oxide is 15 wt %, the active argil is 10 wt %, the kaoline is 15 wt %. The weight ratio of catalyst and rubber is 3.5:1000, and then the mixture is transported into the reactor for the cracking reaction. The cracking temperature is 370° C. and the cracking time is 60 minutes. The liquid state product can be made into needing oil by fractionating. Moreover, the solid state product, which produced after cracking, contains carbon black. And it can be made into carbon black, which can pass the screen of 700 mesh, by the procedure of magnetic separation, comminution and selection by winnowing. In this example, the heat carrier was heated at the furnace and transported into the reactor. Then the heat carrier supplied a quantity of heat for the cracking process. The cracking gas can get combustible gas and oil by fractionating. What's more, the combustible gas, which was desulfurized by the sodium hydroxide, can be directly expelled into or stored and then expelled into the heating furnace for burning. The exhaust gas, making by burning the combustible gas, should be treated again and exhausted out. What's more, the secondary treating can adopt the following mode: refrigerating the exhaust gas below 64° C., then deal with it by the transaction layer of active carbon, active fiber and zeolite molecular sieve, respectively, and the through speed of exhaust gas was controlled at 0.3 m/s. The rest parts exercise the same as the existing technologies.

EXAMPLE 75

The components and weight percentage of the catalyzer are as following: the model of molecular sieve is Y, and the weight percentage is 40. The active alumina is 29 wt %, the zinc oxide is 15 wt %, the active argil is 10 wt % and the kaoline is 8 wt %. The weight ratio of catalyst and rubber is 3.5:1000, and then the mixture is transported into the reactor for the cracking reaction. The cracking temperature is 420° C., the cracking time is 35 minutes and the heating temperature difference in the cracking chamber is 8° C. The liquid state product can be made into needing oil by fractionating. Moreover, the solid state product, which produced after cracking, contains carbon black. And it can be made into carbon black, which can pass the screen of 750 mesh, by the procedure of magnetic separation, comminution and selection by winnowing. In this example, the heat carrier was heated at the furnace and transported into the reactor. Then the heat carrier supplied a quantity of heat for the cracking process. The cracking gas can get combustible gas and oil by fractionating. What's more, the combustible gas, which was desulfurized by the sodium hydroxide, can be directly expelled into or stored and then expelled into the heating furnace for burning. The exhaust gas, making by burning the combustible gas, should be treated again and exhausted out. What's more, the secondary treating can adopt the following mode: refrigerating the exhaust gas below 50° C., then deal with it by the transaction layer of active carbon, active fiber and zeolite molecular sieve, respectively, and the following rate of exhaust gas was controlled at 0.2 m/s. The rest parts exercise the same as the existing technologies.

EXAMPLE 76

The components and weight percentage of the catalyzer are as following: the model of molecular sieve is 5A, and the weight percentage is 41. The active alumina is 28 wt %, the zinc oxide is 19 wt %, the active argil is 12 wt % and the kaoline is 8 wt %. The weight ratio of catalyst and rubber is 4:1000, and then the mixture is transported into the reactor for the cracking reaction. The cracking temperature is 380° C. and the cracking time is 30 minutes. The liquid state product can be made into needing oil by fractionating. Moreover, the solid state product, which produced after cracking, contains carbon black. And it can be made into carbon black, which can pass the screen of 650 mesh, by the procedure of magnetic separation, comminution and selection by winnowing. In this example, the heat carrier was heated at the furnace and transported into the reactor. Then the heat carrier supplied a quantity of heat for the cracking process. The cracking gas can get combustible gas and oil by fractionating. What's more, the combustible gas, which was desulfurized by the conventional desulfurization method, can be directly expelled into or stored and then expelled into the heating furnace for burning. The exhaust gas, making by burning the combustible gas, should be treated again and exhausted out. What's more, the secondary treating can adopt the following mode: refrigerating the exhaust gas below 42° C., then deal with it by the transaction layer of active carbon, active fiber and zeolite molecular sieve, respectively, and the through speed of exhaust gas was controlled at 0.4 m/s. The rest parts exercise the same as the existing technologies.

EXAMPLE 77

The components and weight percentage of the catalyzer are as following: the model of molecular sieve is 3A, and the weight percentage is 42. The active alumina is 26 wt %, the zinc oxide is 11 wt %, the active argil is 10 wt % and the kaoline is 15 wt %. The weight ratio of catalyst and rubber is 5:1000, and then the mixture is transported into the reactor for the cracking reaction. The cracking temperature is 390° C., the cracking time is 30 minutes and the heating temperature difference in the cracking chamber is 7° C. The liquid state product can be made into needing oil by fractionating. Moreover, the solid state product, which produced after cracking, contains carbon black. And it can be made into carbon black, which can pass the screen of 650 mesh, by the procedure of magnetic separation, comminution and selection by winnowing. In this example, the heat carrier was heated at the furnace and transported into the reactor. Then the heat carrier supplied a quantity of heat for the cracking process. The cracking gas can get combustible gas and oil by fractionating. What's more, the combustible gas, which was desulfurized by the conventional desulfurization method, can be directly expelled into or stored and then expelled into the heating furnace for burning. The exhaust gas, making by burning the combustible gas, should be treated again and exhausted out. What's more, the secondary treating can adopt the following mode: refrigerating the exhaust gas below 60° C., then deal with it by the transaction layer of active carbon, active fiber and zeolite molecular sieve, respectively, and the following rate of exhaust gas was controlled at 0.6 m/s. The rest parts exercise the same as the existing technologies.

EXAMPLE 78

The components and weight percentage of the catalyzer are as following: the model of molecular sieve is Y, and the weight percentage is 35. The active alumina is 15 wt %, the zinc oxide is 10 wt %, the active argil is 5 wt % and the kaoline is 5 wt %. The weight ratio of catalyst and rubber is 6:1000, and then the mixture is transported into the reactor for the cracking reaction. The cracking temperature is 350° C., the cracking time is 60 minutes and the heating temperature difference in the cracking chamber is 6□. The liquid state product can be made into needing oil by fractionating. Moreover, the solid state product, which produced after cracking, contains carbon black. And it can be made into carbon black, which can pass the screen of 700 mesh, by the procedure of magnetic separation, comminution and selection by winnowing. In this example, the heat carrier was heated at the furnace and transported into the reactor. Then the heat carrier supplied a quantity of heat for the cracking process. The cracking gas can get combustible gas and oil by fractionating. What's more, the combustible gas, which was desulfurized by the conventional desulfurization method, can be directly expelled into or stored and then expelled into the heating furnace for burning. The exhaust gas, making by burning the combustible gas, should be treated again and exhausted out. What's more, the secondary treating can adopt the following mode: refrigerating the exhaust gas below 40° C., then deal with it by the transaction layer of active carbon, active fiber and zeolite molecular sieve, respectively, and the through speed of exhaust gas was controlled at 0.2 m/s. Moreover, the temperature of the heat carrier can be adjusted at 380° C., which satisfy the temperature request for cracking. The rest parts exercise the same as the existing technologies.

EXAMPLE 79

The components and weight percentage of the catalyzer are as following: the model of molecular sieve is 3A, and the weight percentage is 40. The active alumina is 18 wt %, the zinc oxide is 12 wt %, the active argil is 7 wt % and the kaoline is 11 wt %. The weight ratio of catalyst and rubber is 3:1000, and then the mixture is transported into the reactor for the cracking reaction. The cracking temperature is 360° C., the cracking time is 75 minutes and the heating temperature difference in the cracking chamber is 7° C. The liquid state product can be made into needing oil by fractionating. Moreover, the solid state product, which produced after cracking, contains carbon black. And it can be made into carbon black, which can pass the screen of 650 mesh, by the procedure of magnetic separation, comminution and selection by winnowing. In this example, the heat carrier was heated at the furnace and transported into the reactor. Then the heat carrier supplied a quantity of heat for the cracking process. The cracking gas can get combustible gas and oil by fractionating. What's more, the combustible gas, which was desulfurized by the conventional desulfurization method, can be directly expelled into or stored and then expelled into the heating furnace for burning. The exhaust gas, making by burning the combustible gas, should be treated again and exhausted out. What's more, the secondary treating can adopt the following mode: refrigerating the exhaust gas below 35° C., then deal with it by the transaction layer of active carbon, active fiber and zeolite molecular sieve, respectively, and the following rate of exhaust gas was controlled at 0.7 m/s. Moreover, the temperature of the heat carrier can be adjusted at 400° C., which satisfy the temperature request for cracking. The rest parts exercise the same as the existing technologies.

EXAMPLE 80

The components and weight percentage of the catalyzer are as following: the model of molecular sieve is 4A, and the weight percentage is 45. The active alumina is 20 wt %, the zinc oxide is 15 wt %, the active argil is 10 wt % and the kaoline is 8 wt %. The weight ratio of catalyst and rubber is 5:1000, and then the mixture is transported into the reactor for the cracking reaction. The cracking temperature is 350° C., the cracking time is 50 minutes and the heating temperature difference in the cracking chamber is 2° C. The liquid state product can be made into needing oil by fractionating. Moreover, the solid state product, which produced after cracking, contains carbon black. And it can be made into carbon black, which can pass the screen of 750 mesh, by the procedure of magnetic separation, comminution and selection by winnowing. In this example, the heat carrier was heated at the furnace and transported into the reactor. Then the heat carrier supplied a quantity of heat for the cracking process. The cracking gas can get combustible gas and oil by fractionating. What's more, the combustible gas, which was desulfurized by the sodium hydroxide, can be directly expelled into or stored and then expelled into the heating furnace for burning. The exhaust gas, making by burning the combustible gas, should be treated again and exhausted out. What's more, the secondary treating can adopt the following mode: refrigerating the exhaust gas below 58° C., then deal with it by the transaction layer of active carbon, active fiber and zeolite molecular sieve, respectively, and the through speed of exhaust gas was controlled at 0.2 m/s. Moreover, the temperature of the heat carrier can be adjusted between 380 and 490° C., which satisfy the temperature request for cracking. The rest parts exercise the same as the existing technologies.

EXAMPLE 81

The components and weight percentage of the catalyzer are as following: the model of molecular sieve is 5A, and the weight percentage is 44. The active alumina is 20 wt %, the zinc oxide is 15 wt %, the active argil is 8 wt % and the kaoline is 8 wt %. The weight ratio of catalyst and rubber is 6.5:1000, and then the mixture is transported into the reactor for the cracking reaction. The cracking temperature is 370° C., the cracking time is 60 minutes and the heating temperature difference in the cracking chamber is 1° C. The liquid state product can be made into needing oil by fractionating. Moreover, the solid state product, which produced after cracking, contains carbon black. And it can be made into carbon black, which can pass the screen of 650 mesh, by the procedure of magnetic separation, comminution and selection by winnowing. In this example, the heat carrier was heated at the furnace and transported into the reactor. Then the heat carrier supplied a quantity of heat for the cracking process. The cracking gas can get combustible gas and oil by fractionating. What's more, the combustible gas, which was desulfurized by the sodium hydroxide, can be directly expelled into or stored and then expelled into the heating furnace for burning. The exhaust gas, making by burning the combustible gas, should be treated again and exhausted out. What's more, the secondary treating can adopt the following mode: refrigerating the exhaust gas below 45° C., then deal with it by the transaction layer of active carbon, active fiber and zeolite molecular sieve, respectively, and the through speed of exhaust gas was controlled at 0.3 m/s. Moreover, the temperature of the heat carrier can be adjusted at 405° C., which satisfy the temperature request for cracking. The rest parts exercise the same as the existing technologies.

EXAMPLE 82

The components and weight percentage of the catalyzer are as following: the model of molecular sieve is 3A, and the weight percentage is 46. The active alumina is 25 wt %, the zinc oxide is 15 wt %, the active argil is 6 wt % and the kaoline is 9 wt %. The weight ratio of catalyst and rubber is 4.5:1000, and then the mixture is transported into the reactor for the cracking reaction. The cracking temperature is 420° C., the cracking time is 25 minutes and the heating temperature difference in the cracking chamber is 3° C. The liquid state product can be made into needing oil by fractionating. Moreover, the solid state product, which produced after cracking, contains carbon black. And it can be made into carbon black, which can pass the screen of 700 mesh, by the procedure of magnetic separation, comminution and selection by winnowing. In this example, the heat carrier was heated at the furnace and transported into the reactor. Then the heat carrier supplied a quantity of heat for the cracking process. The cracking gas can get combustible gas and oil by fractionating. What's more, the combustible gas, which was desulfurized by the sodium hydroxide, can be directly expelled into or stored and then expelled into the heating furnace for burning. The exhaust gas, making by burning the combustible gas, should be treated again and exhausted out. What's more, the secondary treating can adopt the following mode: refrigerating the exhaust gas below 55° C., then deal with it by the transaction layer of active carbon, active fiber and zeolite molecular sieve, respectively, and the following rate of exhaust gas was controlled at 0.1 m/s. Moreover, the temperature of the heat carrier can be adjusted at 455° C., which satisfy the temperature request for cracking. The rest parts exercise the same as the existing technologies.

EXAMPLE 83

The components and weight percentage of the catalyzer are as following: the model of molecular sieve is Y, and the weight percentage is 47. The active alumina is 30 wt %, the zinc oxide is 19 wt %, the active argil is 10 wt % and the kaoline is 8 wt %. The weight ratio of catalyst and rubber is 2.5:1000, and then the mixture is transported into the reactor for the cracking reaction. The cracking temperature is 380° C., the cracking time is 40 minutes and the heating temperature difference in the cracking chamber is 5° C. The liquid state product can be made into needing oil by fractionating. Moreover, the solid state product, which produced after cracking, contains carbon black. And it can be made into carbon black, which can pass the screen of 650 mesh, by the procedure of magnetic separation, comminution and selection by winnowing. In this example, the heat carrier was heated at the furnace and transported into the reactor. Then the heat carrier supplied a quantity of heat for the cracking process. The cracking gas can get combustible gas and oil by fractionating. What's more, the combustible gas, which was desulfurized by the sodium hydroxide, can be directly expelled into or stored and then expelled into the heating furnace for burning. The exhaust gas, making by burning the combustible gas, should be treated again and exhausted out. What's more, the secondary treating can adopt the following mode: refrigerating the exhaust gas below 48° C., then deal with it by the transaction layer of active carbon, active fiber and zeolite molecular sieve, respectively, and the through speed of exhaust gas was controlled at 0.4 m/s. Moreover, the temperature of the heat carrier can be adjusted at 415° C., which satisfy the temperature request for cracking. The rest parts exercise the same as the existing technologies.

EXAMPLE 84

The steel wires were separated from rubber by drawing the waste rubber into thread, and then the big pieces of rubber were broken up into granule. What's more, the components and weight percentage of the catalyzer are as following: the model of molecular sieve is Y, and the weight percentage is 50. The active alumina is 29 wt %, the zinc oxide is 20 wt %, the active argil is 15 wt % and the kaoline is 15 wt %. The weight ratio of catalyst and rubber is 2:1000, and then the mixture is transported into the reactor for the cracking reaction. The cracking temperature is 390° C., the cracking time is 30 minutes, and the heating temperature difference in the cracking chamber is 2° C. And the hot molten salt is the best heat carrier. The cracking gas was input into fractionating tower. Moreover, the combustible gas was purified by the sodium hydroxide desulfurization, and stored as the fuel for the heat carrier heater. The liquid state products, which fractionated from the cracking gas, can be made into the needing oil and stored. What's more, the solid state product, which produced after cracking, contains carbon black. And it can be made into carbon black, which can pass the screen of 650 mesh, by the procedure of magnetic separation, comminution and selection by winnowing. After accomplishing the aforementioned process, the high strength and rarefied carbon black can be gained by adding the stearic acid into the carbon black, that's because the zinc stearate can reinforce the role of carbon black. In this example, the heat carrier was heated at the furnace and transported into the reactor. Then the heat carrier supplied a quantity of heat for the cracking process. The exhaust gas, making by burning the combustible gas, should be treated again and exhausted out. What's more, the secondary treating can adopt the following mode: refrigerating the exhaust gas below 50° C., then deal with it by the transaction layer of active carbon, active fiber and zeolite molecular sieve, respectively, and the following rate of exhaust gas was controlled at 0.1 m/s. Moreover, the temperature of the heat carrier can be adjusted at 420° C., which satisfy the temperature request for cracking. The rest parts exercise the same as the existing technologies.

The waste rubber was treated by the cracking technology as the example 84 mentioned, and the contrast of the correlative parameter of the product between the example 84 and the existing technology is as following:

1. The weight percentage of the final product, which is attained by the existing technology, is as following: the fuel is from 31 to 36, the carbon black is 38, the steel wire is 11 and the combustible gas is from 15 to 20.

The weight percentage of the final product, which is attained by the technology of this example, is as following: the fuel is 48, the carbon black is 38, the steel wire is 11 and the combustible gas is 3.

The steel wire and carbon black are not molar losing in the cracking process of this example, thus it can be seen that the use of the waste rubber cracking technology, as this example mentioned, can greatly improve the proportion of the fuel in the final product, and can attain the optimal producing effect. What's more, the use of the low temperature in the cracking process makes the temperature in the whole cracking process is equally below 450☐, which saving abundant energy sources and attaining the optimal cost-effective ratio.

2. The reinforced carbon black, which attained by the technology of this example mentioned, is detected by the carbon black detection method which accords with the national institute of standards. And the idiographic capability of this carbon black is as following: the rubber adding with the reinforced carbon black was sulfurated on the standard sulfuration condition, which is 145☐ and 30 minutes. The elongation ratio of the product is 428%, the tensile strength is 22.8 Mpa, the 300% stretching intensity is 13.6 Mpa, and the rigidity is 69SH. What's more, the other indexes are according or exceeding the national institute of standards. However, the chemical character of the carbon black was changed because of the high cracking temperature using in the existing technology. So the indexes are hard to reach this standard.

3. The combustible gas can be disposed by the existing technology and the optimal indexes are as following: the concentration of the smoke emission is 300 mg/m$^3$, the concentration of the plumbum emission is 0.5 mg/m$^3$, the concentration of the hydrochloric emission is 50 mg/m$^3$, the concentration of the benzene emission is 70 mg/m$^3$, the concentration of the toluene emission is 50 mg/m$^3$, the concentration of the dimethylbenzene emission is 5 mg/m$^3$, the concentration of the formaldehyde emission is 1 mg/m$^3$, the concentration of the hydrargyrum emission is 0.6 mg/m$^3$, the concentration of the fluoride emission is 20 mg/m$^3$, the concentration of the sulfur dioxide emission is 400 mg/m$^3$, the concentration of the carbon monoxide emission is 150 mg/m$^3$, the concentration of the nitrogen oxides emission is 600 mg/m$^3$, the concentration of the sulfureted hydrogen emission is 50 mg/m$^3$, the concentration of the dioxin emission is 20 ng/m$^3$.

In this example, the exhaust gas, which attained by burning the combustible gas in furnace, was treated with a second purifying technology. And the letting standards of the contamination of this example are reaching a lowest level, which completely attain the international request for the environmental protection. The detecting results are as the table 1 showing.

Comparing the detecting results between this example and the existing technology, and using the cracking technology and the following purificatory technology of this invention, it is obvious that the indexes of the exhaust gas, which attained by burning the combustible gas in furnace, are best. What's more, it can farthest reduce the environmental pollution and reach a win-win situation between the interest and the environmental benefit.

TABLE 1

| The analysis index | The means | | The units | The number of laboratory | | |
|---|---|---|---|---|---|---|
| | | | | 6110003-01 | 6110003-02 | 6110003-03 |
| | | | | The identification of pattern | | |
| | | | | Discharge side 1-1 | Discharge side 1-2 | Discharge side 1-3 |
| | | | | The sampling date | | |
| | | | | Nov. 02, 2006 | Nov. 02, 2006 | Nov. 02, 2006 |
| | | | | The incepting date of pattern | | |
| | | | | Nov. 02, 2006 | Nov. 02, 2006 | Nov. 02, 2006 |
| | | | | The exhaust gas | The exhaust gas | The exhaust gas |
| The smoke | The humidity content | GB5468-1991 | % | | 2.02 | |
| | The emission concentration | GB/T16157-1966 | mg/m3 | 0.32 | 0.039 | 0.0025 |
| | The emission speed | | kg/h | | $1.42 \times 10^{-4}$ | |
| Cadmium | The emission concentration | 1) | mg/m3 | <0.008 | <0.008 | <0.008 |
| | The emission speed | | kg/h | | $4.36 \times 10^{-4}$ | |
| Plumbum | The emission concentration | 1) | mg/m3 | <0.08 | 0.116 | <0.08 |
| | The emission speed | | kg/h | | $4.36 \times 10^{-5}$ | |
| Hydrogen Chloride | The emission concentration | 1) | mg/m3 | <0.8 | <0.8 | <0.8 |
| | The emission speed | | kg/h | | $4.36 \times 10^{-4}$ | |
| Benzene | The emission concentration | GB/T14677-1993 | mg/m3 | <0.06 | <0.06 | <0.06 |
| | The emission speed | | kg/h | | $2.91 \times 10^{-5}$ | |
| Toluene | The emission concentration | GB/T14677-1993 | mg/m3 | <0.06 | <0.06 | <0.06 |
| | The emission speed | | kg/h | | $2.91 \times 10^{-5}$ | |
| Dimethylbenzene | The emission concentration | GB/T14677-1993 | mg/m3 | <0.06 | <0.06 | <0.06 |
| | The emission speed | | kg/h | | $2.91 \times 10^{-5}$ | |
| Formaldehyde | The emission concentration | GB/T15516-1995 | mg/m3 | <0.18 | <0.18 | <0.18 |
| | The emission speed | | kg/h | | $1.02 \times 10^{-4}$ | |
| Hydrargyrum | The emission concentration | 2) | mg/m3 | <0.01 | <0.01 | 0.02 |
| | The emission speed | | kg/h | | $7.27 \times 10^{-4}$ | |
| Fluoride | The emission concentration | HJ/T67-2001 | mg/m3 | 0.79 | 0.81 | 0.79 |

TABLE 1-continued

| | | | The number of laboratory | | |
|---|---|---|---|---|---|
| | | | 6110003-01 | 6110003-02 | 6110003-03 |
| | | | The identification of pattern | | |
| | | | Discharge side 1-1 | Discharge side 1-2 | Discharge side 1-3 |
| | | | The sampling date | | |
| | | | Nov. 02, 2006 | Nov. 02, 2006 | Nov. 02, 2006 |
| | | | The incepting date of pattern | | |
| The analysis index | The means | The units | Nov. 02, 2006 The exhaust gas | Nov. 02, 2006 The exhaust gas | Nov. 02, 2006 The exhaust gas |
| | The emission speed | kg/h | | $8.72 \times 10^{-4}$ | |
| Sulfur Dioxide | The emission concentration | HJ/T57-2000 mg/m3 | <3.0 | <3.0 | <3.0 |
| | The emission speed | kg/h | | $1.45 \times 10^{-3}$ | |
| Carbon Monoxide | The emission concentration | 1) mg/m3 | 39.4 | 31.6 | 26.3 |
| | The emission speed | kg/h | | 0.036 | |
| Nitrogen Dioxide | The emission concentration | 1) mg/m3 | 62.6 | 53.6 | 31.3 |
| | The emission speed | kg/h | | 0.054 | |
| Sulfureted Hydrogen | The emission concentration | 1) mg/m3 | 1.60 | 3.91 | 9.18 |
| | The emission speed | kg/h | | $6.33 \times 10^{-3}$ | |
| Dioxin | The emission concentration | EPA Method23 ng/m3 | | 0.00240 | |

I claim:

1. A method for cracking waste rubber, the method comprising:
    adding a rubber mass and a catalyst in a cracking chamber of a cracking reactor and cracking said rubber mass at a temperature ranging from 350 to 450° C.,
    wherein the catalyst comprises a mixture of 35 to 50 wt % aluminosilicate, 15 to 30 wt % active alumina, 10 to 20 wt % zinc oxide, 5 to 15 wt % active argil, and 5 to 15 wt % kaolin, and is present in the cracking reactor in a weight ratio of 2-7:1000 catalyst:rubber mass.

2. The method of claim 1, wherein a heating temperature difference in the cracking chamber is less than or equal to 10° C.

3. The method of claim 1, wherein cracking time ranges from 20 to 60 minutes.

4. The method of claim 1, wherein cracking temperature ranges from 370 to 420° C.

5. The method of claim 4, wherein the cracking temperature ranges from 380 to 390° C.

6. The method of claim 1, further comprising supplying heat to the cracking chamber by a temperature controlled heat carrier, a heating temperature of the heat carrier ranging from 380 to 490° C.

7. The method of claim 1, further comprising:
    heating a heat carrier via a furnace;
    transporting the heat carrier into the reactor, the heat carrier supplying a quantity of heat for the cracking; and
    fractionating a cracking gas to produce combustible gas and oil,
    wherein the combustible gas is desulfurized and either directly expelled into or stored and then expelled into the furnace for burning.

8. The method of claim 7, wherein exhaust gas produced by burning the combustible gas, is treated via a secondary treatment and exhausted out, the secondary treating comprising refrigerating the exhaust gas below 70° C. and processing a transaction layer of active carbon, active fiber, and a zeolite molecular sieve.

9. The method of claim 8, wherein a temperature of the exhaust gas is at least initially below from 40 to 55° C. during the secondary treatment.

10. The method of claim 8, wherein throughput during the secondary treatment of the exhaust gas is controlled between 0.1 and 1 m/s.

11. The method of claim 1, wherein a solid state product, produced after said cracking, contains carbon black, the carbon black being produced by magnetic separation, comminution, and selection by winnowing.

12. The method of claim 11, further comprising after the solid state product is produced, adding stearic acid into the carbon black, so as to produce zinc stearate from the stearic acid and zinc oxide and to reinforce the role of carbon black.

* * * * *